(12) United States Patent
Rossato et al.

(10) Patent No.: US 8,565,525 B2
(45) Date of Patent: Oct. 22, 2013

(54) EDGE COMPARISON IN SEGMENTATION OF VIDEO SEQUENCES

(75) Inventors: Luca Rossato, Milan (IT); Andrea Varesio, Turin (IT)

(73) Assignee: Telecom Italia S.p.A., Milan (IT)

( * ) Notice: Subject to any disclaimer, the term of this patent is extended or adjusted under 35 U.S.C. 154(b) by 741 days.

(21) Appl. No.: 12/087,251

(22) PCT Filed: Dec. 30, 2005

(86) PCT No.: PCT/EP2005/057228
§ 371 (c)(1),
(2), (4) Date: Nov. 24, 2008

(87) PCT Pub. No.: WO2007/076892
PCT Pub. Date: Jul. 12, 2007

(65) Prior Publication Data
US 2009/0154807 A1   Jun. 18, 2009

(51) Int. Cl.
*G06K 9/34* (2006.01)
*G06K 9/48* (2006.01)
*G06K 9/36* (2006.01)

(52) U.S. Cl.
USPC .......................... 382/173; 382/199; 382/232

(58) Field of Classification Search
None
See application file for complete search history.

(56) References Cited

U.S. PATENT DOCUMENTS 5,214,718 A   5/1993   Khosla
5,915,044 A *  6/1999   Gardos et al. ................. 382/236

(Continued)

FOREIGN PATENT DOCUMENTS

| WO | WO 2007/076890 A1 | 7/2007 |
| WO | WO 2007/076891 A1 | 7/2007 |
| WO | WO 2007/076893 A1 | 7/2007 |
| WO | WO 2007/076894 A1 | 7/2007 |

OTHER PUBLICATIONS

Bertolino et al.; "Detecting People in Videos for Their Immersion in a Virtual Space"; Proceedings of the $2^{nd}$ International Symposium on Image and signal Processing and Analysis, in conjunction with the $23^{rd}$ International Conference on Information Technology Interfaces, Univ. Zagreb, Zagreb, Croatia, pp. 313-318, (2001).

(Continued)

*Primary Examiner* — David Zarka
*Assistant Examiner* — Jhere Rowland
(74) *Attorney, Agent, or Firm* — Finnegan, Henderson, Farabow, Garrett & Dunner, L.L.P.

(57) ABSTRACT

A method of image processing, includes: receiving at least one video frame of a video sequence, the at least one video frame including at least one foreground subject and a background; and processing the at least one video frame so as to separate the at least one foreground subject from the background. The processing includes: obtaining a reference image including the background; comparing the at least one video frame to the reference image; and generating a pixel mask as a result of the comparison, the pixel mask indicating whether a pixel of the at least one video frame belongs to the foreground subject or to the background. The method further comprises at least partially determining edges of the at least one foreground subject in the at least one video frame, and modifying the pixel mask based on the determined foreground subject edges.

19 Claims, 11 Drawing Sheets

(56) References Cited

U.S. PATENT DOCUMENTS

| | | | |
|---|---|---|---|
| 6,167,167 A * | 12/2000 | Matsugu et al. | 382/283 |
| 6,259,828 B1 * | 7/2001 | Crinon et al. | 382/305 |
| 6,301,385 B1 * | 10/2001 | Chen et al. | 382/173 |
| 6,625,310 B2 | 9/2003 | Lipton et al. | |
| 6,668,097 B1 | 12/2003 | Hu et al. | |
| 2004/0032906 A1 * | 2/2004 | Lillig | 375/240.08 |
| 2004/0151342 A1 * | 8/2004 | Venetianer et al. | 382/103 |
| 2005/0126505 A1 * | 6/2005 | Gallager et al. | 119/234 |
| 2005/0226506 A1 | 10/2005 | Aharon et al. | |

OTHER PUBLICATIONS

Jabri et al.; "Detection and Location of People in Video Images Using Adaptive Fusion of Color and Edge Information", Pattern Recognition, Proceedings of the 15th International Conference, IEEE Comput. Soc., U.S., vol. 4, pp. 627-630. (2000).

Mureika et al.; "Multifractal Fingerprints in the Virtual Arts"; Leonardo, MIT Press, USA, vol. 37, No. 1, pp. 53-56, (2004).

Chien et al.; "Efficient Moving Object Segmentation Algorithm Using Background Registration Technique"; IEEE Transactions on circuits and systems for Video Technology, IEEE Service Center, vol. 12, No. 7, pp. 577-586, (2002).

Butler et al.; "Real-Time Adaptive Background Segmentation", Proceedings of the International Conference on Acoustics, Speech and Signal Processing (ICASSP-2003), pp. 349-352, (2003).

François et al., "Adaptive Color Background Modeling for Real-Time, Segmentation of Video Streams", Proceedings of the International Conference on Imaging Science, Systems, and Technology, pp. 227-232, (1999).

Lucchese et al., "Color Image Segmentation: A State-Of-The-Art Survey", Proc. of the Indian National Science Academy (INSA-A), vol. 67, A, No. 2, pp. 207-221, (2001).

Kim et al.; "An edge-based Adaptive Morphology Algorithm for Image Noise Reduction", Journal of the Korean Institute of Telematics & Electronics, Seoul, KR, vol. 34S, No. 3, pp. 84-96, (1997) Abstract.

Volodymyr Kindratenko; "Image Processing Techniques", Development and Application of Image Analysis Techniques for Identification and Classification of Microscopic Particles: Part 1, Ph.D. Thesis, http://www.ncsa.utac/edu/(kindr/phd/) pp. 1.1-1.56, (1997).

Cabrelli et al.; "Automatic Representation of Binary Images", IEEE Transactions on Pattern Analysis and Machine Intelligence, IEEE Service Center, vol. 12, No. 12, pp. 1190-1196, (1990).

Nabout et al.; "A Novel Closed Contour Extractor, Principle and Algorithm", IEEE International Symposium on Circuits and Systems (ISCAS), IEEE, US, vol. 1, pp, 445-448, (1995).

Griesser; "Real-Time, GPU-based Foreground-Background Segmentation", Technical Report 269, pp. 1-36, (2005).

Seitner et al.; "Pedestrian Tracking Based on Colour and Spatial Information", Proceeding of the Digital Imaging Computing: Techniques and Applications (DICTA 2005), IEEE Computer Society, 8 pages, (2005).

Ikkjin et al.; "Image Processing on the GPU" University of Pennsylvania, GPU Programming and Architecture, pp. 1-7, (2005).

Feldmann et al.; "Real-Time Segmentation for Advanced Disparity Estimation in Immersive Videoconference Applications," Proc. of WSCG 2002, 10th INT. Conference on Computer Graphics, Visualization and Computer Vision, vol. 10, No. 1, pp. 171-178, (2002).

Hanbury; "Circular Statistics Applied to Colour Images", 8th Computer Vision Winter Workshop, 6 pages, (2003).

LeFevre et al.; "Multiresolution Color Image Segmentation Applied to Background Extraction in Outdoor Images", RFAI Publication, IS&T European Conference on Color in Graphics, Image and Vision, Poitiers (France), pp. 1-9, ( 2002).

Luca Rossato et al.; "Segmentation of Video Sequences", U.S. Appl. No. 12/087,269, filed Oct. 1, 2008.

Luca Rossato et al.; "Average Calculation in Color Space, Particularly for Segmentation of Video Sequences", U.S. Appl. No. 12/087,265, filed Jun. 30, 2008.

Luca Rossato et al.; "Edge-Guided Morphological Closing in Segmentation of Video Sequences", U.S. Appl. No. 12/087,204, filed Aug. 18, 2008.

Luca Rossato et al.; "Contour Finding in Segmentation of Video Sequences", U.S. Appl. No. 12/087,203, filed Aug. 20, 2008.

\* cited by examiner

```
A  6  B  1  C              A  2  B     C
   5  -  2                     1     3
D  4  E  3  F              D  |  E     F
                              6     4
G     H     I              G  5  H     I
```

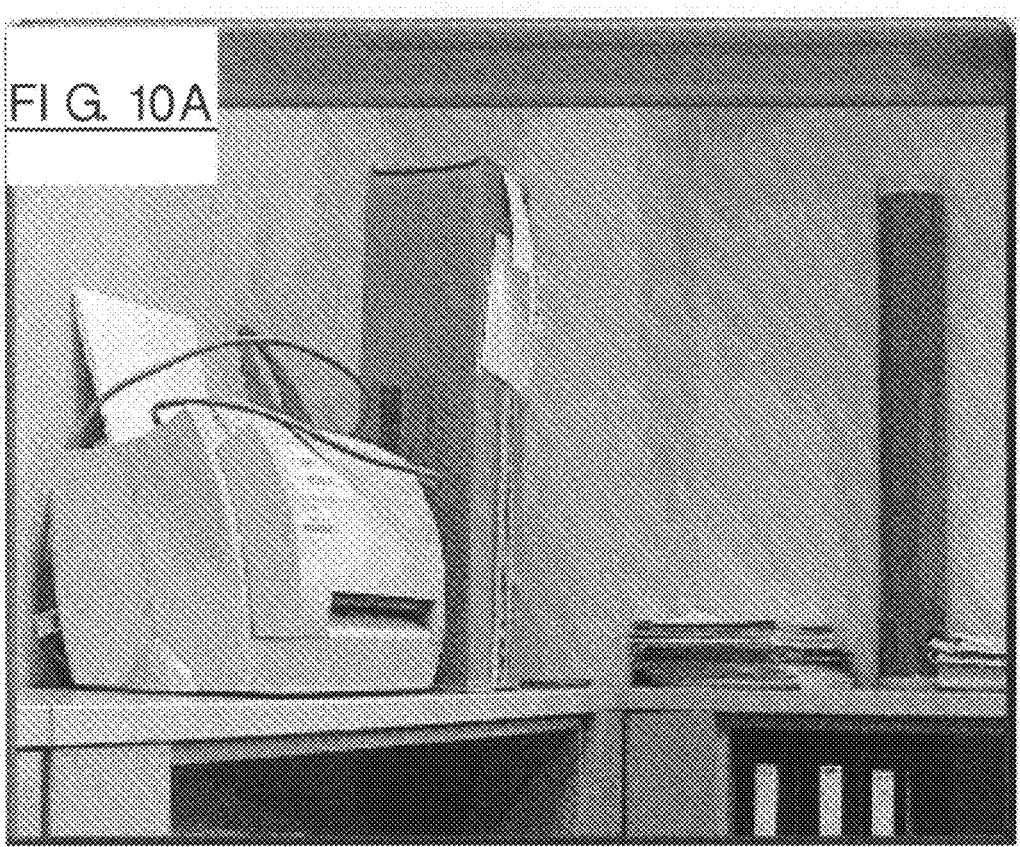
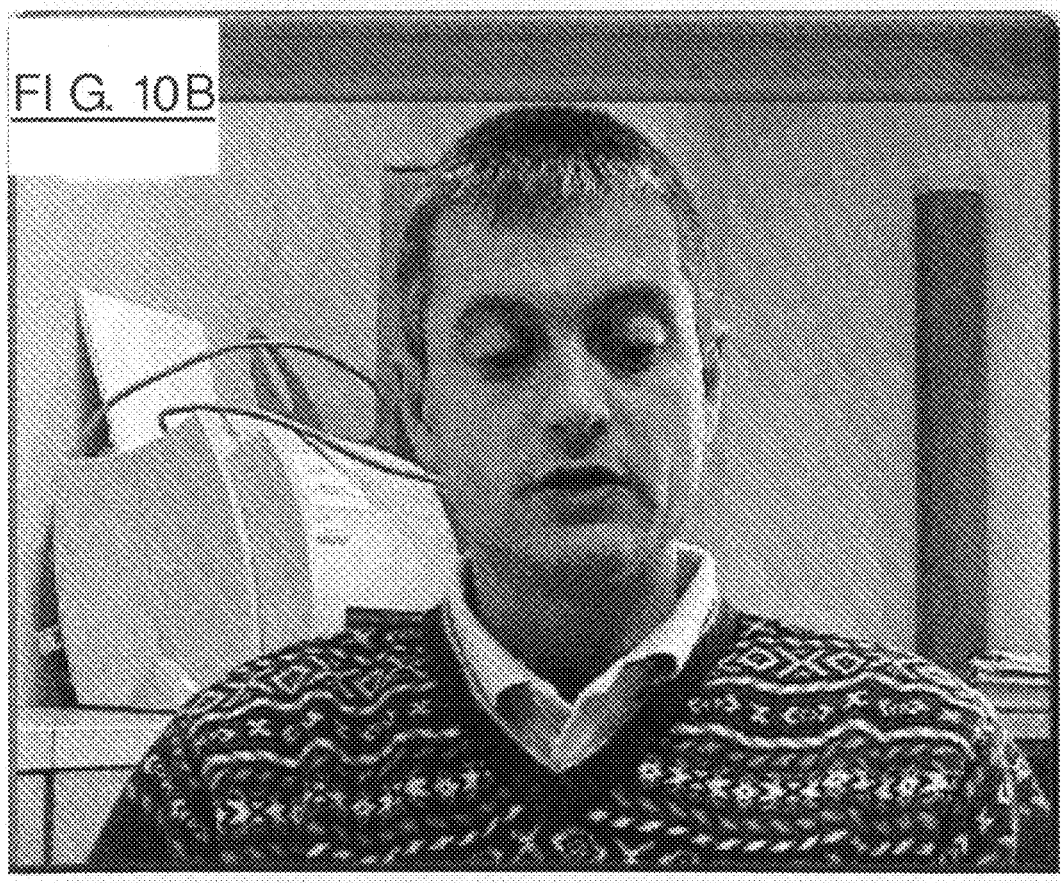

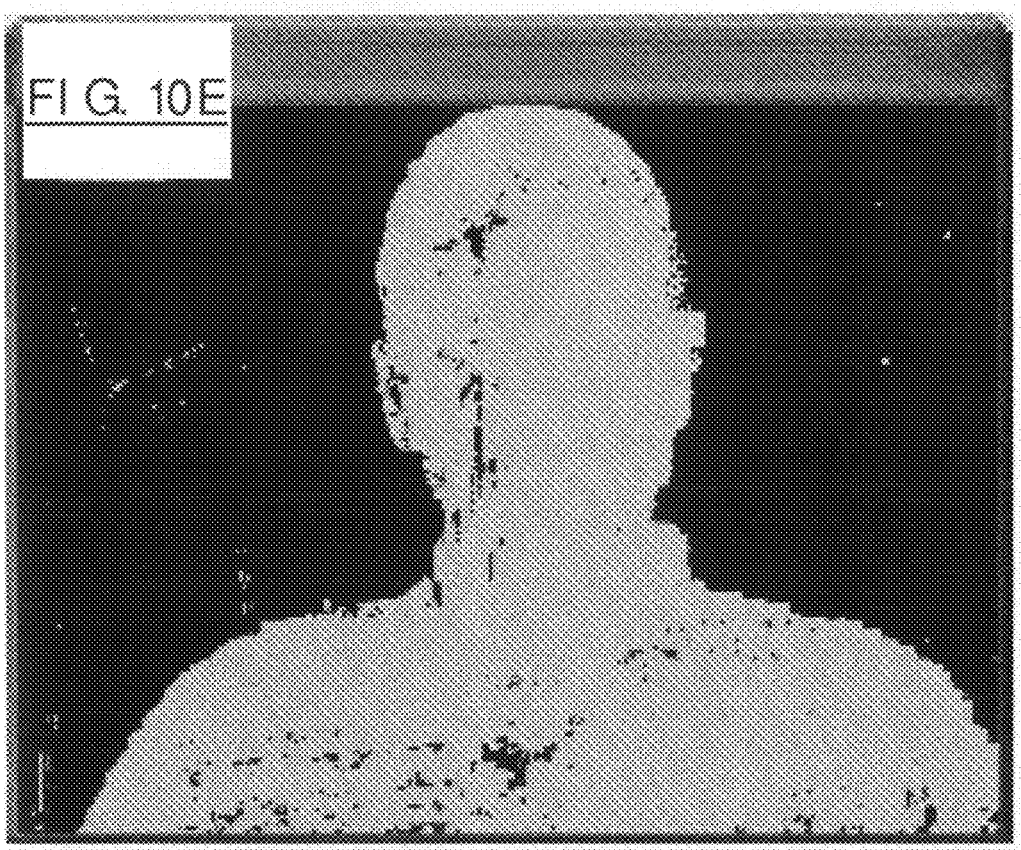
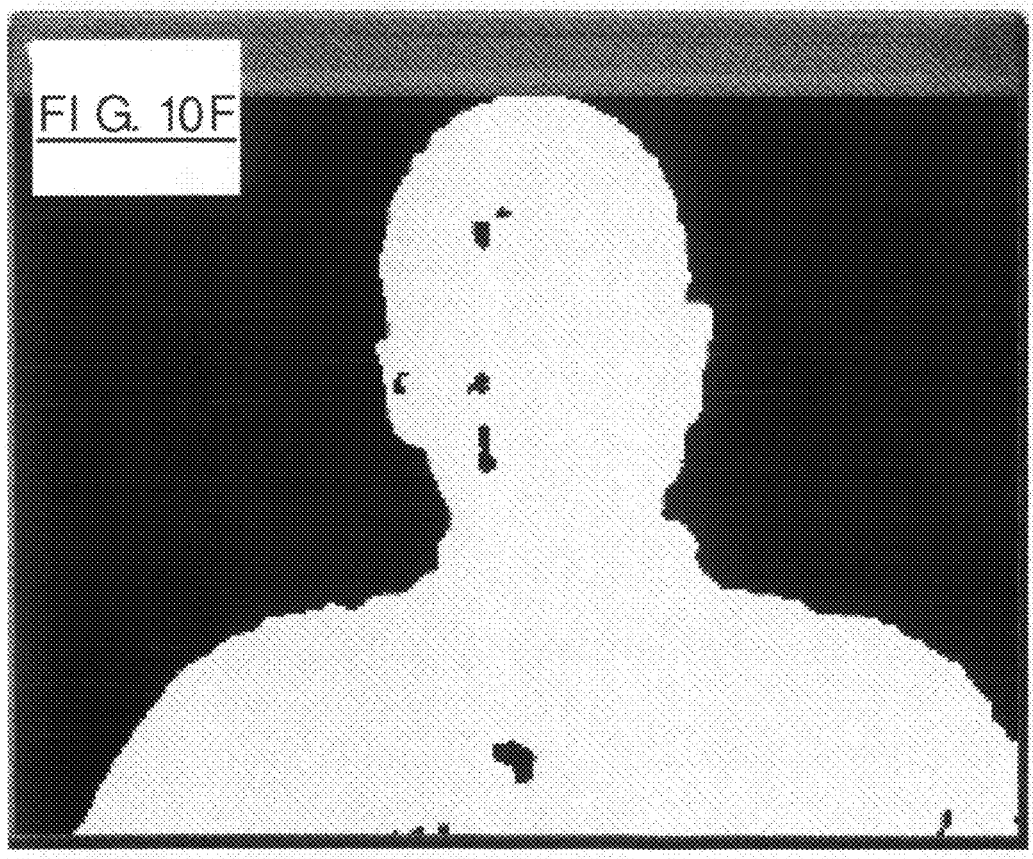

EDGE COMPARISON IN SEGMENTATION OF VIDEO SEQUENCES

CROSS REFERENCE TO RELATED APPLICATION

This application is a national phase application based on PCT/EP2005/057228, filed Dec. 30, 2005.

BACKGROUND OF THE INVENTION

1. Field of the Invention

The present invention generally relates to the field of digital image processing, particularly to processing of digital video, and specifically to segmentation of digital video frames, particularly for background replacement.

2. Description of Related Art

In digital video processing, segmentation of a video stream into distinct component objects is a known and useful technique.

For example, an input video stream may be separated into two different streams, one containing foreground subjects/objects (for the purposes of the present invention, from now on by "foreground subject" it will be intended both foreground subjects, and foreground objects), and the other containing the background of the video frames. In a videocommunication (e.g. videotelephony) sequence between two persons, the foreground is for example represented by a talking person, usually limitedly to the trunk, the head and the arms (a so-called "talking head").

The possibility of segmenting a video sequence into foreground and background streams is for example useful for changing the video sequence background, removing the original background and inserting a substitutive background of users' choice, for instance to hide the talking head surroundings, for reasons of privacy, or to share video clips, movies, photographs, TV sequences while communicating with other persons, and similar applications.

The aim of many segmentation algorithms is to analyze a digital video sequence and to generate a binary mask, the so-called "foreground mask", wherein every pixel of every video frame of the video sequence is marked as either a background or a foreground pixel. In applications like videocommunication, the above operation has to be performed in real time, at a frame rate that, in a sufficiently fluid videocommunication sequence, is of the order of 25 to 30 frames per second (fps).

Several solutions for image segmentation have been proposed in the art.

In L. Lucchese and S. K. Mitra, "Color Image Segmentation: A State-of-the-Art Survey", Proc. of the Indian National Science Academy (INSA-A), New Delhi, India, Vol. 67, A, No. 2, March 2001, pp. 207-221, a review of algorithms for segmentation of color images is provided.

In A. R. J. Francois and G. G. Medioni, "Adaptive Color Background Modeling for Real-time Segmentation of Video Streams," Proceedings of the International Conference on Imaging Science, Systems, and Technology, pp. 227-232, Las Vegas, NA, June 1999, a system is presented to perform real-time background modeling and segmentation of video streams on a Personal Computer (PC), in the context of video surveillance and multimedia applications. The images, captured with a fixed camera, are modeled as a fixed or slowly changing background, which may become occluded by mobile agents. The system learns a statistical color model of the background, which is used for detecting changes produced by occluding elements. It is proposed to operate in the Hue-Saturation-Value (HSV) color space, instead of the traditional RGB (Red, Green, Blue) space, because it provides a better use of the color information, and naturally incorporates gray-level only processing. At each instant, the system maintains an updated background model, and a list of occluding regions that can then be tracked.

In D. Butler, S. Sridharan and V. M. Bove, Jr., "Real-time adaptive background segmentation," in Proceedings of the International Conference on Acoustics, Speech and Signal Processing (ICASSP-2003), pp. 349-352, April 2003, an algorithm is proposed that represents each pixel in the frame by a group of clusters. The clusters are ordered according to the likelihood that they model the background and are adapted to deal with background and lighting variations. Incoming pixels are matched against the corresponding cluster group and are classified according to whether the matching cluster is considered part of the background. The algorithm has allegedly demonstrated equal or better segmentation than the other techniques and proved capable of processing 320×240 video at 28 fps, excluding post-processing.

U.S. Pat. No. 6,625,310 discloses a method for segmenting video data into foreground and background portions that utilizes statistical modeling of the pixels; a statistical model of the background is built for each pixel, and each pixel in an incoming video frame is compared with the background statistical model for that pixel. Pixels are determined to be foreground or background based on the comparisons. In particular, a pixel is determined to match the background statistical model if the value of the pixel matches the mode for that pixel: the absolute difference is taken between the pixel value and the value of the background statistical model for the pixel (i.e., the mode), and it is compared to a threshold. If the absolute difference is less than or equal to the threshold, the pixel value is considered to match the background statistical model, and the pixel is labeled as background; otherwise, the pixel is labeled as foreground.

US 2004/0032906 discloses a method and system for segmenting foreground objects in digital video that facilitates segmentation in the presence of shadows and camera noise. A background registration component generates a background reference image from a sequence of digital video frames. A gradient segmentation component and variance segmentation component process the intensity and chromatic components of the digital video to determine foreground objects and produce foreground object masks. The segmentation component data may be processed by a threshold-combine component to form a combined foreground object mask. A background reference image is identified for each video signal from the digital video, the background reference image is subtracted from each video signal component of the digital video to form a resulting frame; the resulting frame is associated with the intensity video signal component with a gradient filter to segment foreground objects and generate a foreground object mask.

SUMMARY OF THE INVENTION

The Applicant has observed that the solutions proposed in the art for the segmentation of digital video sequences are not completely satisfactory, and produce visible and hardly acceptable artifacts in the reconstructed, displayed video sequence.

In more detail, the Applicant has observed that a region in which artifacts may be generated is the region at the contours of the foreground subjects. These artifacts are particularly perceived by a person watching a segmented video sequence, whose attention is particularly attracted by the contours of foreground subjects.

The Applicant has found that these artifacts may be originated by the fact that the foreground mask generated by simple comparison of the values of the pixels in a current video frame to the values of the corresponding pixels in a background reference image is too rough an approximation of the actual foreground subjects. In particular, a foreground mask generated as above may fail in following the actual contour of the foreground subjects, due to the fact that the foreground and the background have the tendency to "blending together" in the generated image at the foreground contour.

The Applicant has tackled the problem of devising a new method for digital image processing, particularly adapted to segmentation of foreground subjects from background in video sequences, which reduces the artifacts in the reconstructed, displayed video sequence, particularly at the contours of foreground subjects.

The Applicant has found that this problem may be solved by at least partially determining edges of the foreground subjects in the video frames, and then by modifying a foreground mask based on the determined edges. Known algorithms can be exploited for determining edges in a video frame.

According to a first aspect of the present invention, a method is provided.

The method comprises:
receiving at least one video frame of a video sequence, the at least one video frame comprising at least one foreground subject and a background; and
processing said at least one video frame so as to separate said at least one foreground subject from said background;
wherein said processing includes:
obtaining a reference image including said background;
comparing the at least one video frame to the reference image; and
generating a pixel mask as a result of said comparison, said pixel mask indicating whether a pixel of the at least one video frame belongs to the foreground subject or to the background.

The method further comprises at least partially determining edges of said at least one foreground subject in said at least one video frame; and modifying the pixel mask based on the determined foreground subject edges.

A second aspect of the invention relates to a data processing apparatus comprising at least one module adapted to perform the image processing method of the first aspect.

Other aspects of the invention are set forth in the appended dependent claims.

BRIEF DESCRIPTION OF THE DRAWINGS

The features and advantages of the present invention will be made apparent by the following detailed description of some embodiments thereof, provided merely by way of non limitative examples, in connection with the annexed drawings, wherein:

FIGS. 10A to 10H are screen captures showing intermediate steps of a video segmentation process according to an embodiment of the present invention.

DETAILED DESCRIPTION OF THE PREFERRED EMBODIMENT(S) OF THE INVENTION

Figure 1:
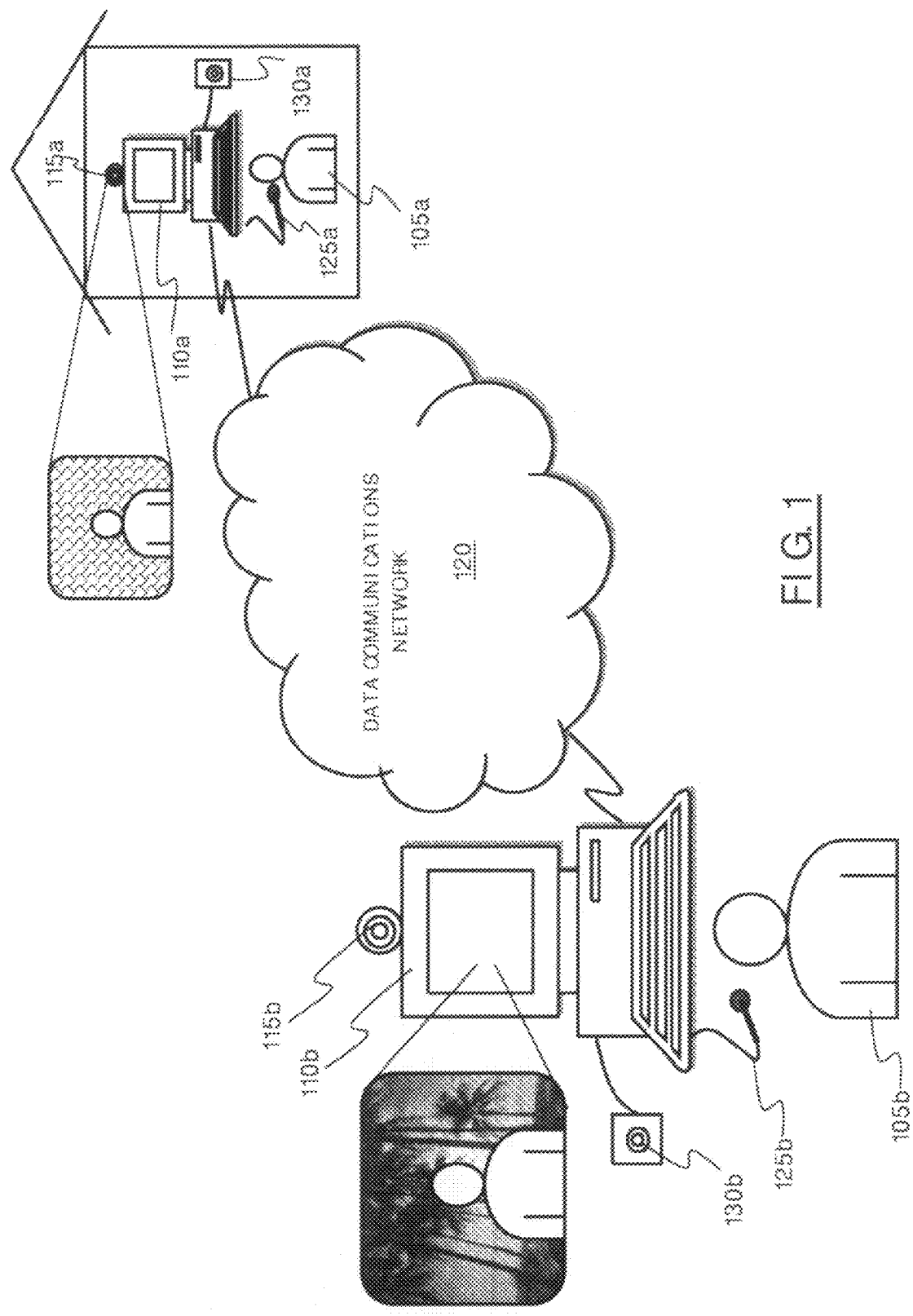
FIG. 1 schematically shows an exemplary scenario wherein a method according to an embodiment of the present invention is advantageously used.

Making reference to the drawings, in FIG. 1 there is schematically depicted an exemplary scenario wherein a digital video segmentation method according to an embodiment of the present invention can be advantageously applied.

Two users 105a and 105b, having respective data processing apparatuses 110a and 110b (like for example PCs, notebooks, laptops, pocket PCs, PDAs, mobile or fixed videophones, set-top-boxes associated to TV screens, videoconference apparatuses, or equivalent devices) equipped with video capturing devices 115a and 115b, like videocameras, and audio capturing devices, like microphones 125a and 125b, are engaged in a videocommunication session. The two users are assumed to be remote from each other, where by "remote" there is intended generally physically separated, for example located in different rooms of a building, up to located in different continents of the world. The two data processing apparatuses 110a and 110b are in communication relationship through a data communications network 120, like a LAN, a MAN, a WAN, the Internet, a PSTN/PLMN (e.g. mobile) telephony network. The connection of the data processing apparatuses 110a and 110b to the network 120, through suitable network access points (not shown in the drawing) may be a wired connection, a wireless connection, or a mix thereof. In particular, by wireless connection there may be intended a WiFi connection, a Bluetooth connection, a GSM connection, a UMTS connection, or any other non-wired connection.

It is pointed out that the scenario depicted in FIG. 1 is merely exemplary and not limitative: the present invention is applicable in many alternative scenarios.

As mentioned above, the two users 105a and 105b are assumed to be engaged in a videocommunication session, during which they exchange both audio and video contents. In particular, at the transmitter premises (in a bidirectional communication, both the users play the role of transmitter and receiver), audio (e.g., voice) is captured by the microphones 125a and/or 125b, whereas the video sequence(s) are captured by the videocameras 115a and/or 115b; at the receiver premises, the captured video sequence(s) is(are) reproduced and displayed on the display device(s) of the data processing system(s), whereas the audio content is reproduced through loudspeaker/earphones 130a and/or 130b.

It is assumed that real-time video segmentation tools are implemented at either one (or both) of the users' data processing apparatuses 110a and 110b. The generic video segmentation tool is adapted to analyze the videocommunication sequence captured by the cameras 115a and/or 115b, so as to determine which pixels of a generic video frame of the captured video sequence belong to an image foreground subject, like for the example the user 105a or 105b (the so-called "talking head"), and which pixels belong instead to the rest of the image, forming the so-called image background. Thanks to the video segmentation tools, the users can for example decide to replace the actual background with a different one: for example, as pictorially shown in the drawing, the user 105a, which is actually at home during the videocommunication sequence, appears to the user 105b on a totally different background.

Figure 2:
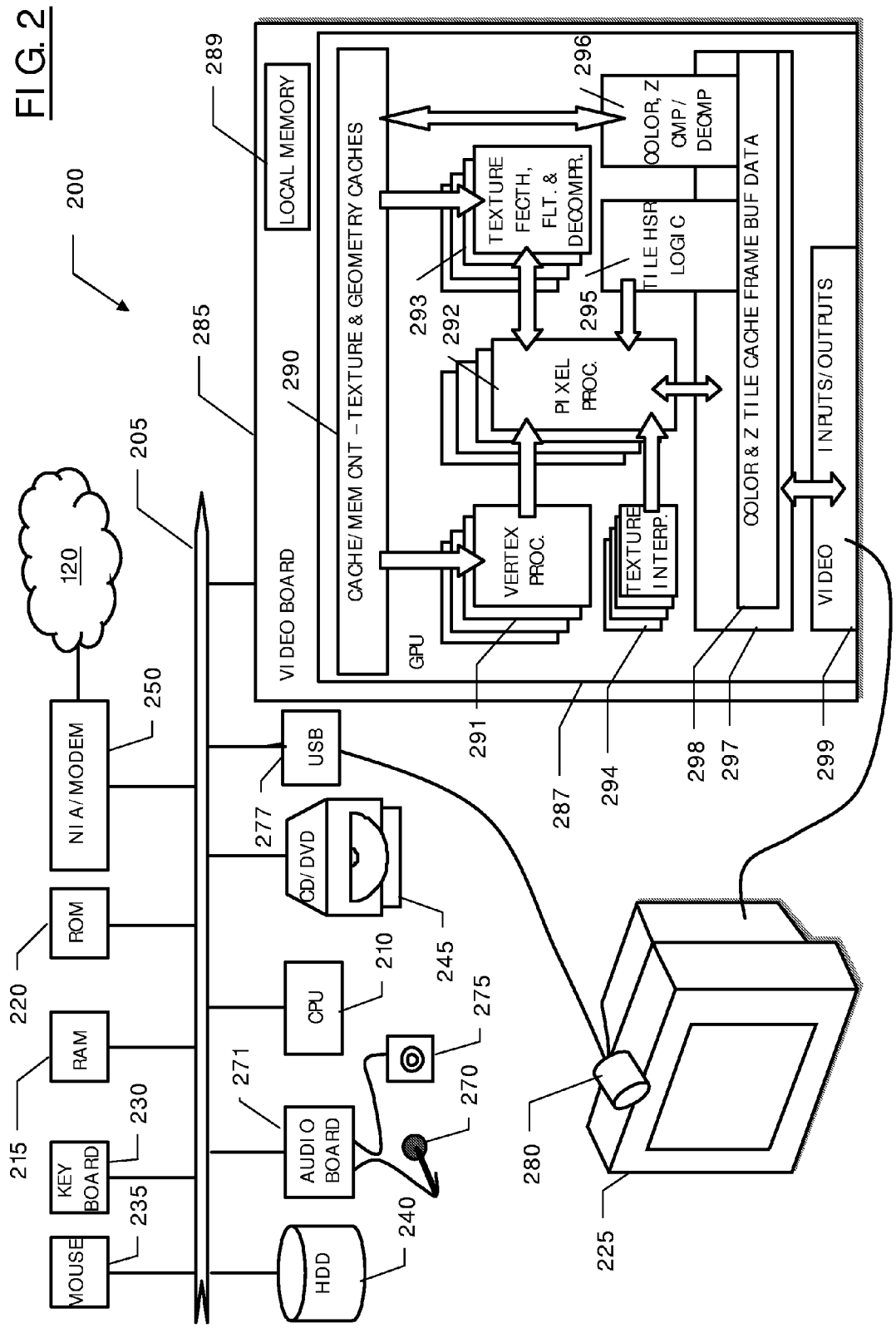
FIG. 2 schematically shows, in terms of functional blocks, an exemplary embodiment of a generic data processing apparatus that, suitably programmed, is adapted to implement the method according to an embodiment of the present invention.

FIG. 2 schematically shows the main functional blocks of a generic, exemplary data processing apparatus 200, like one of the data processing apparatuses 110a and 110b of FIG. 1. Several functional units are connected in parallel to a data communication (e.g., a PCI) bus 205. In particular, a Central Processing Unit (CPU) 210, typically comprising a microprocessor (possibly, in high-performance data processing apparatuses, a plurality of cooperating microprocessors), controls the operation of the data processing apparatus 200. A working memory 215, typically a RAM (Random Access Memory) is directly exploited by the CPU 210 for the execution of programs and for the temporary storage of data during program execution; a Read Only Memory (ROM) 220 is used for the non-volatile storage of data, and stores for example a basic program for the bootstrap of the computer, as well as other data, like low-level configuration data for the data processing apparatus 200. In particular, the RAM may be structured as a main RAM (typically a DRAM) and a cache RAM, typically a SRAM, and the microprocessor may embed a first-level cache RAM. The ROM may include an electrically-alterable non-volatile memory, like a Flash memory and/or an EEPROM.

The data processing apparatus 200 comprises several peripheral units, connected to the bus 205 by means of respective interfaces. Particularly, peripheral units that allow the interaction with a human user are provided, such as a display device 225 (for example a CRT, an LCD or a plasma monitor), a keyboard 230, a pointing device 235 (for example a mouse), a microphone 270, a loudspeaker and/or earphones 275, a videocamera 280. In particular, the display device 225 is managed by a video subsystem (also referred to as graphics accelerator) 285, typically a PCB (Printed Circuit Board) distinct from and associated with (typically, electrically and mechanically connected to) a data processing apparatus motherboard carrying the CPU 210. The microphone 270 and the loudspeaker/earphone 275 are similarly managed by an audio board 271. The videocamera 280 is for example connected to a port of a Universal Serial Bus (USB) adapter 277 with one or more USB ports. In alternative, the video subsystem 285 may include a video capturing hardware, and be adapted to directly manage the videocamera 280, particularly to directly receive captured video frames It is pointed out that the provisions of video and/or audio boards distinct from the CPU motherboard is a common solution, but is not to be intended as limitative for the present invention, which can as well apply when for example no video and/or audio boards are provided, and the respective components as mounted on the CPU motherboard. It is also pointed out that the presence of a video subsystem is not to be intended as a limitation of the present invention: in alternative invention embodiments, the video subsystem may be absent, and the display device be managed directly by the CPU.

The data processing apparatus 200 also includes peripheral units for local mass-storage of programs (operating system, application programs) and data (files), such as one or more magnetic Hard-Disk Drive (HDD), globally indicated as 240, driving magnetic hard disks, a CD-ROM/DVD drive 245, or a CD-ROM/DVD juke-box, for reading/writing CD-ROMs/DVDs. Other peripheral units may be present, such as a floppy-disk drive for reading/writing floppy disks, a memory card reader for reading/writing memory cards, printers and the like. For the connection to the data communications network 120, the data processing apparatus 200 is further equipped with a Network Interface Adapter (NIA) card 250, for example an Ethernet card, a WiFi card, a Bluetooth card, or, alternatively (or in addition), the data processing apparatus 200 may be connected to the data communications network 120 by means of a MODEM, e.g. a dial-up modem, or a x-DSL modem, or a satellite modem. In the case of a smart mobile phone, a radio communications interface is provided, intended to include all the HW and SW components necessary for enabling the mobile phone access a mobile telephony network, e.g. a GSM/GPRS(EDGE) or UMTS network.

In a way per-se known in the art, the video subsystem 285 includes a GPU (Graphic Processing Unit, sometimes also referred to as Visual Processing unit—VPU) 287, i.e. a programmable (co)processor devoted to autonomously perform processing of data relating to images and videos to be displayed on the display device 225. The GPU 287 implements a number of graphics primitive operations in a way that makes running them much faster than drawing directly to the display device with the host CPU. The video subsystem 285 may also include local working memory resources 289, for the use by the GPU; it is however noted that in last-generation PCs, featuring high-speed data buses, the video subsystems exploit the data processing apparatus working memory 215.

As known in the art, modern GPUs are designed to operate as computer three-dimensional (3D) graphics generators, for the (3D) rendering process adopted for example in last-generation animation movies and videogames. GPUs are not general purpose processors as the CPUs, and even modern GPUs have a quite limited programmability; in particular, only two points of the rendering pipeline (roughly speaking, by pipeline there is intended the sequence of processing steps that, applied to input data, produces the output data) are programmable: the video board can execute so-called "vertex shader" programs and "pixel shader" programs. Generally speaking, and without entering into excessive details well known to those skilled in the art, a vertex shader program is a program that is invoked in respect of each vertex of a polygonal mesh that is used to described 3D objects to be drawn; a pixel shader program is instead a program that is invoked in respect of each pixel of the an already existing image, typically the image drawn by the vertex shader program.

FIG. 2 schematically depicts the internal structure of the GPU 287; it is pointed out that, being aspects per-se known in the art, the GPU description will not go into deep detail. The GPU 287 has a memory controller unit 290 controlling the GPU access to the local memory 289, and including texture and geometry cache memories and a cache controller. The GPU 287 includes a plurality 291 of vertex processors, programmable for executing vertex shader programs, a plurality of pixel processors 292, programmable for executing pixel shader programs, a plurality of texture fetch, filtering and decompression units 293 for feeding the pixel processors with filtered and decompressed textures, read from the memory 289 (and/or, possibly, from the memory 215), a plurality of texture and color interpolators 294, a tile HSR (Hidden Surface Removal) logic 295, a color and Z-coordinate (i.e., pixel depth) compression/decompression unit 296. A frame buffer logic 297 includes anti-aliasing units (not explicitly shown), and a color and Z tile cache 298. Video input/output interfaces 299 include for example a VGA interface for the connection of the display device 225 and/or additional interfaces, like a TV interface.

According to an embodiment of the present invention, the processing power of the video subsystem 285 and, in particular, of the GPU 287 is expediently exploited for performing at least part of the steps of a video segmentation algorithm, wherein said part of the steps of a video segmentation algorithm includes in particular steps for the generation of the foreground mask to be used for segmenting foreground subject(s) from a video sequence. This allows relieving the CPU 210 from a significant computing burden. In particular, the pixel processors 292 are expediently exploited. More particularly, according to an embodiment of the present invention, the pixel processors 292 of the GPU 287 are suitably programmed for executing a pixel shader program adapted to carry out at least part of the steps of the video segmentation algorithm, as it will be described in detail in the following of the present document. It is however pointed out that the use of the video subsystem, and particularly of the GPU processing power, for performing at least part of the steps of a video segmentation algorithm is not to be intended as a limitation of the present invention, which remains valid even if the video segmentation algorithm, at least as far as the generation of the foreground mask is concerned, is performed on the CPU, not on the GPU.

The rules to be followed in writing a pixel shader program to be executed by the pixel processors 292 are very rigid. A pixel shader program is a program producing, as a result, the color, the shade to be assigned to each single pixel of an image. From a pixel shader program viewpoint, images are represented in terms of so-called "textures" (i.e., mono- or generally N-dimensional arrays), which are stored in areas of the memory 289; a generic image pixel corresponds to an element of a texture, wherein information regarding properties of that pixel (e.g., the color) are stored. For example, a pixel shader program may receive in input an input texture, corresponding for example to an input digital image to be processed, and generate, as a result of the processing, an output texture, corresponding to the processed digital image. If a pixel shader program is invoked in respect of a certain pixel of the image, and the output texture is assumed to be stored in an area of the memory 289, the only location of the memory 289 that can be written is the location corresponding to the output texture element that corresponds to the considered pixel. More than one output textures can be managed by the pixel processors of the GPU, but in such a case all the output textures are to be written simultaneously. Also, it is not possible to simultaneously read from and write into memory locations wherein a same texture is stored. These restrictions stem from the fact that the GPU pixel processors process the pixels in lots, which run through the GPU hardware simultaneously, in parallel, independent processing pipelines (up to 32 independent pipelines are supported in modern GPUs), so that the result of the processing of a certain pixel does not (and cannot) affect the processing of the other pixels (e.g., the adjacent pixels), which are being processed at the same time (or at different times) in the same or in other pipelines. For these reasons, a GPU cannot execute a program implementing a sequential algorithm, but only algorithms wherein the processing of each pixel is independent from the processing of the other pixels of the image. The Applicant has taken these constraints in due consideration in deciding which activities of the video segmentation to delegate to the GPU, and how to write the program to be executed by the GPU.

According to an embodiment of the present invention, the algorithm for the video segmentation method is structured in a succession of several phases, each of which involves processing wherein the result of the processing of each pixel does not affect (and/or depend on) the remaining image pixels, and that are implemented by the GPU, plus a final phase, involving a sequential processing, which is implemented by the CPU (after a transfer of data from the GPU to the CPU). It is however pointed out that, in alternative embodiments of the invention, the number and type of phases of the video segmentation algorithm that are implemented by the GPU may vary. Possibly, no processing phases are performed by the GPU.

Figure 3:
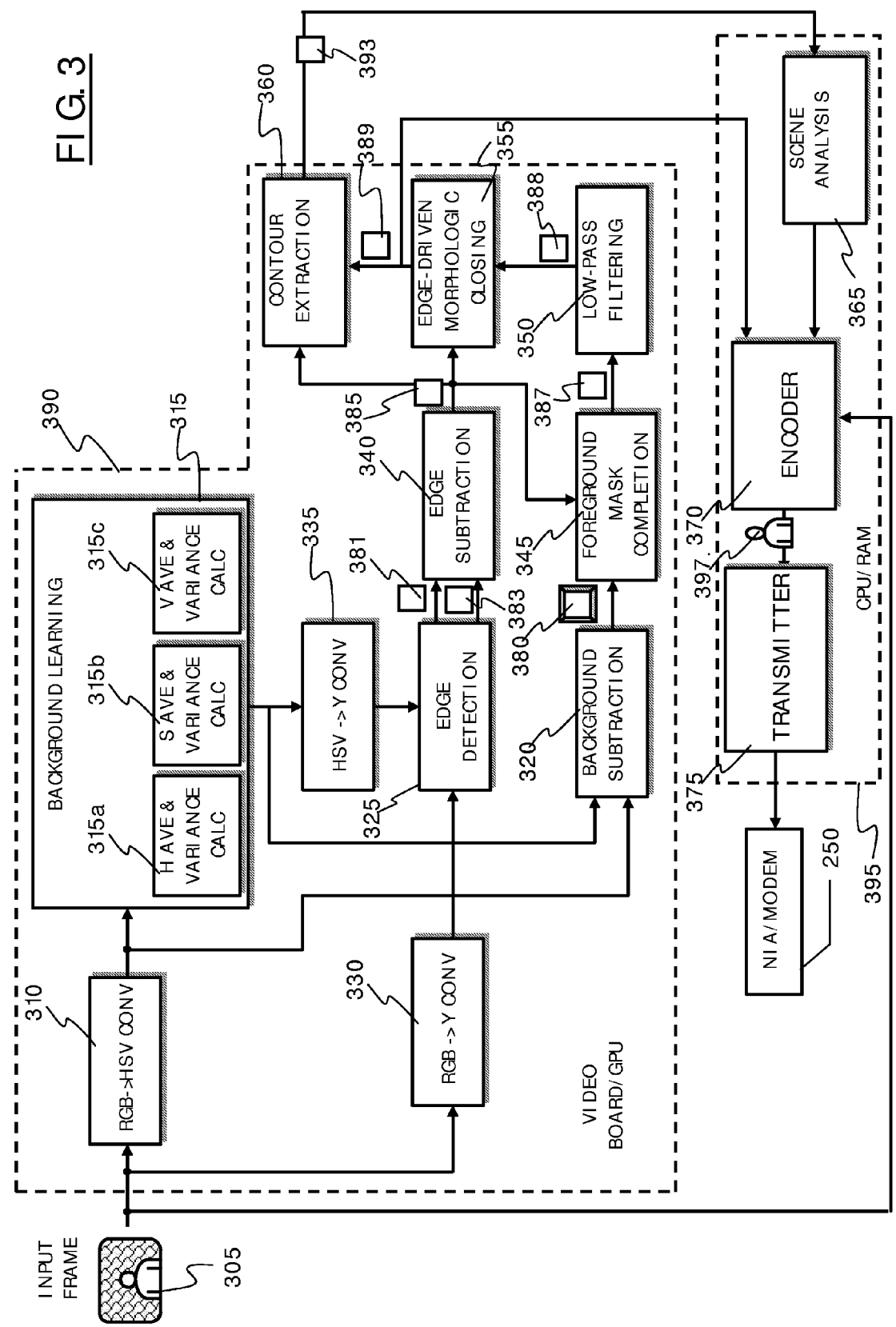
FIG. 3 depicts, in terms of functional blocks, exemplary components adapted to implement a method according to an embodiment of the present invention.

FIG. 3 is a schematic representation in terms of functional blocks of the main components of a video segmentation algorithm according to an embodiment of the present invention; it is pointed out that the generic functional component may be a software component, a hardware component, or a mix of software and hardware.

The video segmentation algorithm is assumed to be implemented at either one or both the data processing apparatuses 110a and 110b.

In particular, the functional blocks enclosed in a broken line denoted 390 corresponds to operations performed by a pixel shader program executed by the pixel processors 292 of the GPU 287, whereas the functional blocks enclosed in a broken line denoted 395 corresponds to operations performed by one or more programs executed by the CPU 210.

An input frame 305, e.g. a frame of the video stream captured by the videocamera 115a or 115b, is fed to an RGB-to-HSV converter module 310, for the conversion of the image description from the RGB (Red, Green, Blue) color space into the HSV (Hue, Saturation, Value) color space.

As known in the art, the RGB is the format used by many of the commercially available videocameras.

The conversion into the HSV format is preferred because the RGB color space is not perceptually uniform: in the RGB color space, numerically equal color differences in different colors are not perceived by the human eye as equal differences when the different colors are displayed; for example, if the green component is varied, the perceived color change is much more evident than in the case the blue component is varied of a same amount; differently, the metric in the HSV color space is essentially the same as that adopted by the human eye, so that working in the HSV color space produces better video segmentation results.

The formulas for the conversion from RGB into HSV are known in the art, and are the following:

max=max(R,G,B);
min=min(R,G,B);
V=max
S=(max−min)/max
if S=0
then H is meaningless
else
delta=max−min
if R=max then H=(G−B)/delta
if G=max then H=2+(B−R)/delta
if B=max then H=4+(R−G)/delta

H=H*60 if H<0 then H=H+360

It can be appreciated that the S and V coordinates of the HSV space are linear coordinates, normalized to 1, and their values range from 0 to 1; the coordinate H is an angular coordinate whose value ranges from 0° to 360°. A conventional graphical representation of the HSV space is in term of a cone turned upside-down, with the apex at the bottom and the base at the top; the cone axis is the axis of the V coordinate; the axis of the S coordinate is perpendicular to the V axis; the H coordinate indicates an angle formed with the S axis by a segment lying in a plane containing the S axis and orthogonal to the V axis, and starting from the origin of the V and S axis. In such a graphical representation, the dark colors, having low luminosity, are close to the bottom of the cone (close to the apex, which corresponds to black); the primary colors (and, in general, the saturated colors) correspond to points located on the cone surface, and become brighter and brighter moving along the V axis, from the apex towards the base; the low-saturated colors, tending to gray, are located within the cone close to the V axis, whereas the points of the V axis correspond to gray tones, and white is at the top of the V axis. From this graphical representation, it is possible to appreciate that the HSV space better describes the human eye's operation: where it is more difficult for the human eye to distinguish different colors, i.e. where the luminosity is scarce, the points of the HSV space are closer to each other (i.e., the are hardly distinguishable by comparison with a threshold); on the contrary, the brighter colors, especially the saturated ones, are more clearly distinguishable, and in fact the corresponding points in the HSV space are far from each other (i.e., they are easily distinguishable by comparison with a threshold).

The RGB to HSV conversion is an operation that is suitable to be performed by a pixel shader program, because it is executed on each pixel independently of the values of the other pixels of the image. Thus, the RGB-to-HSV conversion module 310 can be implemented as a (part of a) pixel shader program executed by the (pixel processors 292 of the) GPU 287, taking the RGB values from an input texture and writing the corresponding HSV values in an output texture. However, nothing prevents that, in alternative embodiments of the invention, the RGB to HSV conversion is performed by the CPU 210.

It is pointed out that even if the videocamera does not furnish the captured video stream in the RGB format, but in a different format, it is possible to obtain the RGB format by way of a conversion: for example, in the case of an undersampling videocamera, e.g. providing video frame data in the common YUV 4:2:0 format, the RGB format may be reconstructed by a suitable filtering, an operation that most of the commercially available video boards are capable of performing directly in hardware.

The HSV-converted video frame is fed to a background learning module 315, adapted to build a reference image of the background to be used in subsequent phases of the video segmentation process for deciding whether a pixel belongs to the image background or foreground.

In particular, in an embodiment of the present invention, it is assumed that the background remains essentially unchanged during the video sequence; this is a reasonable assumption in many applications, like for example those involving videocommunications, where the talking head is located in a room. However, nothing prevents that in alternative invention embodiments the background may change, so that adaptive background learning algorithms could be used.

The background learning module 315 is adapted to learn how the background is. For such purpose, the background learning module 315 is adapted to build a statistical model of the background, to be then used as a reference background image. In order to build the desired statistical model, a predetermined number of video frames of the sole background environment (without subjects in foreground) are captured by the videocamera and processed. The background learning module 315 calculates, for each pixel, average value of the captured samples. Furthermore, the background learning module 315 calculates, for each pixel, the variance (or, equivalently, the standard deviation, which is the square root of the variance) of the captured samples. It is observed that, in principle, even a single video frame might be sufficient to define a background reference image, however, due to the inherent noise of the videocamera sensor, and to possible instabilities in the scene lighting, it is preferable to consider more than one video frames; for example, 100 video frames may be regarded as a sufficiently reliable statistical sample.

It is also observed that building the background statistical model by calculating average value (and the variance) of the pixel values for the prescribed number of video frames means making an assumption that each pixel may be described by a unimodal statistical distribution, i.e. a distribution wherein the different samples gather around a single (average) value; such a model is suitable in several practical cases, but for example it is not suitable in case the videocamera is not sufficiently steady, or when a flashing light is visible in background: in the latter case, two different average values, and two different variances should be calculated for the pixel values, one for the case of light turned on, the other for the case of light turned off.

According to an embodiment of the present invention, the background learning module 315 includes in particular average value and variance calculator modules 315a, 315b and 315c for the H, S and V coordinates of the color space.

Since the S and V coordinates of the HSV space are, as mentioned, linear coordinates, the average value and the variance for the S and V values of a generic pixel can be calculated, as known from statistics, using the following formulas:

$$\text{average value: } \overline{X}_N = \frac{\sum_{i=1}^{N} x_i}{N}$$

$$\text{variance: } \sum_N^2 = \frac{1}{N-1}\sum_{i=1}^{N} x_i^2 - \frac{N}{N-1}\overline{X}_N^2$$

wherein $x_i$ denotes the S or V value of the considered pixel for the i-th sample, and N is the total number of samples (in the present case, the predetermined number of video frames of the sole background).

The calculation of the average value and of the variance for the H angular coordinate cannot proceed in the same way as for the linear coordinates S and V. Just by way of example, let it be assumed that two pixels of two different video frame samples have respective H coordinates equal to 1° and 359°, i.e., in the graphical representation of the HSV space, two points very close to the S positive half-axis (due to angle periodicity, the point having H=359° corresponds to the point having H=−1°, and is thus as close to the point having H=0° as the point having H=1°): the arithmetic average would be 180°, which however is totally incorrect, because corresponds to a point located on the S negative half-axis.

According to an embodiment of the present invention, a method for calculating the average value (and the variance) of the H coordinate is provided that is not affected by the above-mentioned problems.

Figures 5, 6A, 6B, 7A, 7B:
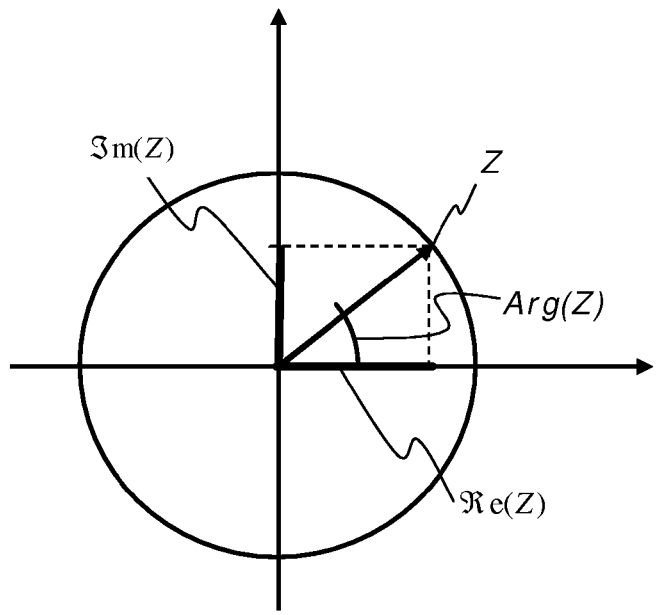
FIG. 5 is an explanatory diagram of a method for calculating average value and variance for an angular color space coordinate, particularly the H coordinate of the HSV color space, according to an embodiment of the present invention.
FIGS. 6A and 6B show a group of neighboring pixels and a corresponding coefficient mask for the calculation of a pixel convolution, for example to perform a high-pass filtering.
FIGS. 7A and 7B show two exemplary coefficient masks for performing a Sobel high-pass filtering along the horizontal and the vertical direction on pixel luminance values, so as to determine a luminance gradient.

In detail, as depicted in FIG. 5, the coordinate H of a generic pixel is assumed to represent the phase (or the argument) Arg(Z) of a complex number Z; the modulus of the complex number Z may for example be set equal to the value of the S coordinate of the pixel, or, alternatively, be put equal to 1 (this second choice may be regarded as preferable, because in such way the color information included in the value of the S coordinate, already taken into account in the calculated average and variance of the S coordinate, is kept separated from the color information included in the value of H coordinate).

Given the values of the phase H, the calculation of the real part $\Re e(Z)$ and of the imaginary part $\Im m(Z)$ of the complex number Z practically corresponds to calculating a sine and a cosine of the value of the H coordinate:

$$\Re e(Z)=\cos(H), \Im m(Z)=\sin(H).$$

The real and imaginary parts $\Re e(Z)$ and $\Im m(Z)$ of the complex number Z are linear quantities, so that their average value for two or more different complex numbers Z, corresponding to the H coordinates of two or more pixels, or to a same pixel but belonging to different video frames, can be calculated as a usual arithmetic average, as described before in connection with the S and V coordinates. Denoting with $\bar{R}_N$ and $\bar{I}_N$ the average values of the real and imaginary parts $\Re e(Z)$ and $\Im m(Z)$ of a population of complex numbers Z corresponding to the H coordinate of the pixels in the various samples of the sole background, the modulus of the average of the complex numbers is:

$$|\bar{Z}_N|^2 = \bar{R}_N^2 + \bar{I}_N^2$$

whereas the phase of their average, which is the average of the H coordinate, is:

$$\bar{H} = \arctan\left(\frac{\bar{I}_N}{\bar{R}_N}\right)$$

(where, for the purposes of the present invention, arctan is a 4-quadrant arctangent, for values of H in the range from 0° to 360°).

With regards to the variance, it can mathematically be demonstrated that, for complex numbers, the formula is:

$$\sum_N{}^2 = \frac{1}{N-1}\sum_{i=1}^N |z_i|^2 - \frac{N}{N-1}|\bar{Z}_N|^2$$

wherein $z_i$ denotes the complex number corresponding to the H coordinate value of the i-th sample; in case the complex numbers $z_i$ all have unitary modulus, it follows:

$$\sum_N{}^2 = \frac{1}{N-1}N - \frac{N}{N-1}|\bar{Z}_N|^2 = \frac{N}{N-1}(1-|\bar{Z}_N|^2).$$

Intuitively, if several complex numbers having unitary modulus and similar phases are averaged, the resulting, average complex number should have phase similar to the phases of the averaged complex numbers, and practically unitary modulus; if, on the contrary, several complex numbers having different phases, possibly distributed uniformly between 0° and 360°, are averaged, the resulting average complex number is a complex number having indeterminate phase (large variance of H, tending to 1) and modulus practically equal to zero.

It is pointed out that the calculation of the average value and the variance for the H, S and V coordinates of the pixels in the different background samples is an operation that can be carried out independently for each pixel, so that the background learning module 315 is adapted to be implemented as a (part of a) pixel shader program executed by the (pixel processors of the) GPU.

In particular, it is observed that up-to-date GPUs have, among the primitives of the pixel processors, the sine and cosine functions: in this case, the calculation of the real and imaginary parts of the complex number Z starting from the value of the H coordinate can be directly performed; in case the GPU does not have the sine and cosine primitives, the values for the sine and cosine functions might be tabulated and stored in memory as an array, interpreted by the GPU as a 1D texture, for example for each degree, and the desired value for the real and imaginary parts of the complex number Z can be obtained by reading the 1D texture using the value of the coordinate H as an entry.

In commercially available GPUs, the arctangent is instead not a primitive of the pixel processors; thus, in order to calculate the average of the H coordinate, the arctangent values may be tabulated and stored, for example, in the form of a matrix, which is interpreted by the GPU as a 2D texture, which is then read using the average of the real and imaginary parts $\bar{R}_N$ and $\bar{X}_N$ as abscissa and ordinate, respectively.

It is however pointed out that, in alternative embodiments of the invention, the calculation of the average value and the variance for the H, S and V coordinates of the pixels may be an operation carried out by the CPU 210.

It can be appreciated that in order to build the desired background statistical model, it is not necessary that the GPU stores all the values of all the background samples (which would probably cause a saturation of the video board memory): for calculating the summations in the above formulas it is sufficient that the GPU, as the video frames with the background samples arrives, keeps a running total of the values of the S and V coordinates and of the real and imaginary parts of the complex numbers corresponding to the H coordinate of the pixels; for calculating the variance, it is sufficient to keep a running total of the squares of the values of the S and V coordinates (whereas the variance of the H coordinate entirely depends on the modulus of the average of the complex numbers Z corresponding to the values of the H coordinate). Advantageously, since the textures used by the GPU are typically adapted to store, for each pixel, four values, corresponding to the channels R, G, B and A (alpha, i.e. an indicator of the pixel opacity), the running totals necessary for calculating the average values and the variances fit in a single texture (for example, the running totals for the real and imaginary parts $\Re e(Z)$ and $\Im m(Z)$ of the complex numbers Z can be stored in the places normally used for the R and G channels, and the running totals for the S and V coordinates can be stored into the places normally used for the B and A channels).

Since, as mentioned in the foregoing, the GPU cannot simultaneously read from and write to a same texture, the running totals of the S and V values, and of the squares thereof, can be calculated exploiting two textures, used alternatively in ping-pong mode; if, for example, for the generic, current M-th video frame the totals previously calculated are stored in the first one of the two textures, which forms the input texture for the current iteration, the pixel coordinate values of the M-th video frame are added (pixel by pixel) to those stored in and read out of the first texture, and the result of the addition is stored into the second texture; at the next, (M+1)-th video frame, the input texture is represented by the second texture, and the values stored therein are read out and added (pixel by pixel) to the coordinate values of the (M+1)-th video frame, and the result stored in the first texture. This ping-ponging between the first and the second texture is repeated until the background learning is completed. Preferably, the textures used are in floating-point form, in order to improve precision and to avoid overflows.

In particular, each time a video frame is passed to the GPU 287, the CPU also passes thereto an updated counter value providing an updated count N of the received video frames, as well as the value N/(N−1), in order to allow the GPU to calculate "on the fly" the average value and the variance, as the video frames are received and processed.

Coming back to FIG. 3, a background subtraction module 320 is adapted to generate a first, approximate foreground binary mask 380, by comparison of a current video frame with a reference image, particularly (but not limitedly) the background statistical model built by the background learning unit 315. In particular, the background subtraction module 320 generates the approximate foreground binary mask 380 by subtracting the background statistical model from a current video frame (converted into HSV format). For the purposes of the present description, by "mask" there is intended a matrix of elements, wherein the generic element of the matrix corresponds to an image pixel; in particular, the foreground mask is a mask in which the value of the generic matrix element provides an indication of the fact that the corresponding pixel belongs to the image background or foreground. For example, a pixel belonging to the image background can be assigned a logic "0", whereas a pixel belonging to the foreground can be assigned a logic "1". In particular, the background subtraction module 320 receives the average values of the H, S and V coordinates, calculated by the average value and variance calculator modules 315a, 315b and 315c of the background learning module 315. For every pixel of the current video frame (including the pixels belonging to the foreground subjects, e.g. the talking head to be segmented from the background), the background subtraction module 320 is adapted to compare the current values of the H, S and V coordinates to the corresponding average values $\overline{H}$, $\overline{S}$ and $\overline{V}$ calculated (and stored) for that pixel by the background learning module 315. In order to perform the comparison, a difference between the current value and the average value can be performed for the H, S, V component. If the calculated difference is relevant (for example, if it exceeds a predetermined threshold), the pixel is regarded as belonging to the foreground, and a corresponding value in the first foreground binary mask 380 is conventionally set to "1"; differently, the pixel is regarded as belonging to the background, and the corresponding value in the first binary mask 380 is conventionally set to "0" (the opposite convention may be adopted).

It is observed that an advantage of the adoption of the HSV description is that it allows separating the pixel color information (given by the H and S components) from that related to the pixel brightness (V component); this allows setting, for each of the three H, S and V coordinates, a different threshold for the recognition of the image foreground subjects. In this way, it is for example possible to remedy to the fact that, for videos captured in conditions of scarce ambient light, or in presence of light having a strong color dominance, the videocamera is typically not able to correctly evaluate the hues: by using the HSV description, the tolerance in respect of the H coordinate can be increased; if instead the light is strong and neat and enables clearly distinguishing the different colors, it is possible to increase the precision for the hue detection (H coordinate), at the same time decreasing the precision for the brightness (V coordinate), so as to reduce the effects of projected shadows (that cause a change in the luminosity of the pixels without altering their color).

Preferably, in order to determine that a difference between a value of one of the three H, S, V coordinates and the respective average value is significant, a comparison threshold should not be too low, otherwise the inevitable videocamera noise would cause almost all of the pixels to be erroneously regarded as belonging to the image foreground (reasonably, none of the pixels in the current video frame is identical to the its counterpart in the background statistical model, i.e. the current H, S, V values are not identical to the averages calculated in the background learning phase). Also, it is preferable not to use a fixed comparison threshold for all the pixels of the video frame, because image areas affected by noise to a different extent, e.g. due to differences in the scene luminosity, would be treated in a different way. Furthermore, the comparison threshold should preferably be adjusted each time the light conditions (and thus the videocamera thermal noise) change. The adjustment of the comparison threshold may be automatic.

According to an embodiment of the present invention, the background subtraction module 320 is adapted to calculate, pixel by pixel, the absolute value of the difference of the value of the each of the H, S, V coordinates to the corresponding average value calculated by the background learning module 315, and to compare the calculated absolute value difference to the standard deviation of the considered coordinate; if the calculated (absolute value) difference exceeds a value related to, e.g. proportional to the corresponding standard deviation, the difference is considered non-negligible and indicative of the fact that the pixel considered belongs to the image foreground; for example, considering the H coordinate, the difference is considered non-negligible if:

$$|H - \overline{H}| > \alpha_H \sqrt{\frac{\Sigma^2}{H}}$$

wherein $\alpha_H$ is a proportionality, multiplication factor that, depending on its value, renders the operation of background subtraction more or less sensitive (in principle, the multiplication factor $\alpha_H$ may be any real number. By increasing the value of the multiplication factor $\alpha_H$, the differences necessary to consider a pixel as belonging to the foreground increase, and thus the result is less sensitive to noise; however, a high value of the multiplication factor $\alpha_H$ may cause the generation of a binary mask having several "holes" in the area of a foreground subject, in cases in which the color of the foreground subject resembles that of the surrounding background. The multiplication factors can be equal or different for the three coordinates H, S and V; preferably, the value of the multiplication factors may be (independently) adjusted by the user, so as to find the best trade off between robustness and precision of the foreground detection. Taking the absolute value of the differences ensures equal treatment to positive and negative differences.

The background subtraction module 320 is in particular adapted to combine the results of the three tests (schematically represented by a "?" in the following inequalities):

$$|H - \overline{H}| \overset{?}{>} \alpha_H \sqrt{\frac{\Sigma^2}{H}}, |S - \overline{S}| \overset{?}{>} \alpha_S \sqrt{\frac{\Sigma^2}{S}}, |V - \overline{V}| \overset{?}{>} \alpha_V \sqrt{\frac{\Sigma^2}{V}}$$

performed on every pixel for the H, S and V coordinates thereof, in order to determine whether the generic pixel is a foreground or a background pixel. For example, the three test results may be combined logically in a logic AND, or in a logic OR: in the former case, all the three components (H, S, V) of a generic pixel shall differ significantly from the respective calculated average values in order for the considered pixel to be regarded as belonging to the foreground; in the latter case, it is sufficient that just one of the three components has a significant deviation for regarding the pixel as belonging to the foreground. The Applicant observes that better performances are obtained with the OR logic combination, because for the human eye it is sufficient that the hue is different for perceiving two colors as different (even if the saturation and the luminosity are the same). Other combinations of the three test results are possible; for example, in a method adapted to suppress the shadows projected by foreground subjects onto the background, the decision of whether a pixel belongs to the background, but is in shadow due to the presence of a foreground subject, may be based on the fact that the values of the coordinates H and S are almost equal to the corresponding averages, but the value of the coordinate V is decreased (compared to the calculated average) in a way similar to the decrease in the coordinate V experienced by the neighboring pixels.

It is pointed out that the background subtraction operation is an operation that can be carried out independently for each pixel, thus the background subtraction module 320 is adapted to be implemented as a (part of a) pixel shader program executed by the (pixel processors of the) GPU. However, nothing prevents that, in alternative embodiments of the present invention, the background subtraction operation is performed by the CPU 210.

The logical AND and OR operations may be performed by the GPU, reproducing them by means of multiplications and/or additions of binary numbers.

In principle, the approximate foreground mask could already be used for segmenting the foreground from the background in the video sequence. However, as mentioned in the foregoing, the Applicant has observed that in this case artifacts would be produced at the contours of foreground subjects in the reconstructed and displayed video sequence, which would be particularly perceived by a person watching the segmented video sequence.

In order to overcome this problem, the Applicant has found a method for improving the approximate foreground mask produced by comparison of the current video frame to the reference image.

According to an embodiment of the present invention, in order to implement the said foreground mask improvement, an edge detection module 325 is adapted to detect edges in the video frames. In particular, in an embodiment of the present invention, the edge detection module 325 is adapted to detect edges in the current video frames and in the background statistical model, and to compare them.

Several operators are known in the art which are adapted to detect edges of subjects in digital images. Typically, high-pass filtering operators based on gradient are used. One of such operators is the so-called Sobel operator, which is a high-pass filtering operator providing good performances even in presence of relatively noisy digital images, and providing as a result essentially continuous edge lines, not fragmented into several separated segments.

The Sobel operator performs a convolution (practically, a weighted sum) between the digital image under consideration (in the present case, the current video frame, or the background statistical model) and a high-pass filtering mask with predetermined coefficients. The high-pass filtering mask is for example an n×n mask, e.g. a 3×3 mask, wherein the central coefficient corresponds to a pixel currently under processing within the digital image to be filtered, and the remaining coefficients apply to the neighboring pixels, as schematically shown in FIGS. 6A and 6B; in particular, FIG. 6A shows a pixel under processing (z5) and its neighboring pixels in a 3×3 image portion, and FIG. 6B shows the high-pass filtering mask. The convolution R is calculated by centering the filtering mask on the currently processed pixel, and adding the products of the pixel values with the respective coefficients:

$$R = w_1 z_1 + w_2 z_2 + \ldots + w_9 z_9 = \sum_{i=1}^{9} w_i z_i$$

In particular, choosing a suitable high-pass filtering mask, it is possible to calculate the gradient of a certain quantity expressing a property of the pixels (like one of the coordinates H, S, V) in a predetermined direction. FIGS. 7A and 7B show two exemplary 3×3 masks corresponding to Sobel operators for calculating the gradient of a certain quantity along two orthogonal directions, respectively the horizontal and the vertical directions. Using the mask of FIG. 7A, the horizontal component $G_x$ of the gradient of a certain quantity is given by:

$$G_x = (z_3 + 2z_6 + z_9) - (z_1 + 2z_4 + z_7)$$

whereas using the mask of FIG. 7B the vertical component $G_y$ of the gradient is calculated as:

$$G_y = (z_7 + 2z_8 + z_9) - (z_1 + 2z_2 + z_3)$$

It is pointed out that in alternative embodiments of the invention different operators may be used to detect the edges.

It is pointed out that the convolution operation is an operation in which the result calculated for the generic pixel depends only on the previous values of the neighboring pixels, and not on the result of the convolution calculated for the neighboring pixels; thus, it can be performed by a (part of a) pixel shader program executed by the (pixel processors of the) GPU. In particular, in a first input texture the values of the pixels of, e.g., the current video frame are stored, whereas in a second input texture the coefficients of the Sobel operator mask are stored; the GPU calculates, for each pixel, a convolution of the values of the neighboring pixels to the considered pixel based on the coefficients of the Sobel operator mask, and the result is stored into an output texture. However, in alternative embodiments of the present invention, the convolution operation for determining the edges may be performed by the CPU.

In principle, the edges for the three H, S, and V pixel coordinates could be calculated separately, so as to obtain three distinct edge maps. The edge maps calculated for the H and S components are however not particularly useful in the determination of the image foreground subjects, partly because too noisy, partly because they add little information to the edges calculated on the basis of the image luminosity.

Also, it is preferable not to directly use the value of the V coordinate; since the V component is calculated as the maximum of the three R, G, B components, a peak of noise on even a single one of the three R, G, B components totally reflects on the value of V, thus, if in the edge detection the Sobel operator is applied to the V component, possible noise peaks would have a strong impact.

According to an embodiment of the present invention, the edge detection is performed by applying the Sobel operator to the luminance value of the pixels, which is calculated as a weighted average of the R, G, B components:

$$Y=0.299R+0.587G+0.114B.$$

To this purpose, an RGB to Y converter unit 330 converts the current video frame from the RGB format into the Y format.

It is pointed out that the calculation of the luminance value Y is an operation carried out individually pixel by pixel; thus, it can be performed by a (part of a) pixel shader program executed by the (pixel processors of the) GPU. However, nothing prevents that the calculation of the Y value is performed by the CPU.

As mentioned, the edge detection module 325 is also adapted to calculated edges in the reference image, particularly in the statistical background model calculated during the background learning. To this purpose, a HSV-to-Y converter module 335 converts the average values of the H, S and V components calculated by the background learning module 315 into a corresponding Y value, for each pixel. In particular, the conversion from the HSV space into the Y value may be performed in one step or in two steps, with an intermediate conversion into the RGB space. Also the calculation of the Y value for the pixels of the statistical background model can be performed by a (part of a) pixel shader program, executed by the (pixel processors of the) GPU. However, nothing prevents that the calculation of the Y value for the pixels of the background model is performed by the CPU.

The edge detection module 325 calculates the horizontal and vertical components $G_x$ and $G_y$ of the gradient of the luminance Y, and the modulus of the luminance gradient is calculated as $G=\sqrt{G_x^2+G_y^2}$. The value of the gradient modulus provides an indication of whether the considered pixel belongs or not to an edge of an image subject: pixels located in essentially uniform image areas features a value of G close to zero, whereas pixels located on an edge of an image subject features high values of G. If desired, the 4-quadrant arctangent arctan $$\left(\frac{G_y}{G_x}\right)$$

of the luminance gradient can be calculated, so to obtain an additional indication on the angle formed by the edge with the horizontal axis.

The edge detection module 325 produces two edge maps 381 and 383: the first edge map 381 is a map of the edges in the background statistical model (which can be calculated once and for all after the background statistical model has been created), and the second edge maps 383 is a map of the edges in the current video frame. The edge maps 381 and 383 include, for each pixel in the background statistical model and, respectively, in the current video frame, the respective value of the luminance gradient.

An edge subtraction module 340 receives the two edge maps 381 and 383, and is adapted to compare, e.g. to subtract the edges calculated in respect of the statistical background model from the edges calculated in respect of the current video frame. Subtracting the edges may correspond to subtracting the value of the luminance gradient calculated for the background statistical model from the value of the luminance gradient calculated in respect of the current video frame, for each pixel.

In particular, if the edge (luminance gradient) subtraction gives a positive value for a given pixel, then the pixel under consideration is regarded as belonging to an edge of the current image that was not present in the background statistical model: such a pixel thus reasonably belongs to a foreground subject. A negative value is instead an indication of the fact that the considered pixel belongs to an edge present in the background, but not in the current image: this may reasonably mean that the edge in the background is hidden (or occluded) by the foreground subject, e.g. by the talking head, so there is a good probability that the considered pixel belongs to the foreground. A luminance gradient difference value close to zero is an indication that the pixel belongs to a relatively uniform area, or that it belongs to an edge that was present in the background and that remains unaltered in the current video frame; in this case, no useful information is provided.

The edge subtraction module 340 generates a pixel by pixel map 385 of the edge differences. The map of edge differences 385 and the approximated foreground binary mask 380 generated by the background subtraction module 320 can be fed to a foreground mask completion module 345, adapted to combine, pixel by pixel, the information included in the first approximated foreground binary mask 380 with the information included in the map of edge differences 385.

In particular, in an embodiment of the present invention, the approximated foreground binary mask 380 is stored in a first GPU input texture, the map of edge differences 385 is stored in a second GPU input texture, and the foreground mask completion module 345 is adapted to load the first and the second input textures; the foreground mask completion module 345 is then adapted to transform the edge difference values contained in the map of edge differences 385 into Boolean values, by comparison of the absolute difference values with a predetermined threshold, so to obtain an intermediate edge differences binary mask. For example, a suitable threshold may be 0.5: if the difference between the edges (i.e., between the luminance gradients) in the current video frame and those in the background statistical model exceeds the value of 0.5, then it is likely that the pixel belongs to the foreground, and that pixel, in the edge differences binary mask, is set to "1". Then, the binary values in the approximated foreground binary mask 380 are combined in logic OR with the Boolean values in the edge differences binary mask. It is pointed out that similar or equivalent operations may be performed by the CPU without involving the GPU.

By combining the approximated foreground binary mask with the map of the edge differences (transformed in binary form), the foreground mask completion module 345 is adapted to complete (or at least to add information to) the approximated foreground binary mask 380, which as mentioned is a first, rough approximation of the foreground mask, by adding thereto those pixels which are characterized by a "1" in the edge differences binary mask; the added pixels typically lie at the borders of the foreground area, and are particularly important because they are located in image areas wherein the background and the foreground colors are blended, so that the background subtraction may provide erroneous results. Furthermore, it is observed that at the borders of the foreground subjects the attention of a viewer is typically attracted, thereby even small adjustments and corrections are very important for the quality of the perceived result of the segmentation algorithm.

It is pointed out that the comparison threshold used in the process of assigning to an edge difference value a Boolean value may be adjustable: for example, the user may prefer a segmented foreground subject with sharp rather than smooth contours: in the first case, more pixels belonging to the foreground subject contours are added to the approximated foreground binary mask, whereas in the second case less pixels are to be added. The adjustment may be automatic, based on measures performed on the videocamera: if even a slight (a displacement of even 1 or 2 pixels) videocamera movement is detected, the majority of the contours will change in position, so the comparison threshold should be increased; if on the contrary the videocamera is steady and the scene is well illuminated, the perceived contours do not change, and the comparison threshold may be decreased.

The high-pass filtering, the calculation of the map of edge differences 385 and the mask completion are operations that can be performed by the GPU; however, nothing prevents that, in alternative embodiments of the invention, one or more of these operations may be performed by the CPU.

It is pointed out that, in alternative embodiments of the invention, the foreground mask completion module 345 may use, for completing the approximated foreground binary mask 380, the edge map 383, instead of the difference between the edge map 383 and the edge map 381.

The completed foreground binary mask 387 may be used for segmenting the foreground from the background in the current video frame. However, in a preferred but not limitative embodiment of the present invention, the completed foreground binary mask 387 is further processed, to further improve the segmentation result.

In particular, the completed foreground binary mask 387 is then preferably fed to a low-pass filtering module 350, adapted to perform a low-pass filtering, particularly albeit not limitedly a Gaussian filtering, directed to reduce (or even to eliminate) singularities, i.e. pixels of value ("0" or "1") different from all the surrounding pixels, and thus to improve the spatial correlation of the foreground mask. In this way, isolated noise peaks in the background area, that may have caused, in the completed foreground binary mask 387, isolated pixels or small clusters of pixels classified as foreground (i.e. conventionally characterized by a "1") in the completed foreground binary mask 387 may be removed, being them erroneous (in the final, segmented image, these pixels would be visible as a sort of "snow" superimposed on the image); similarly, small-sized "holes" in the foreground area, i.e. pixels classified as background (i.e. characterized by a "0") and surrounded by a large number of pixels classified as background, typically caused by random similarities between the foreground color and the background color (due for example to light reflection, chromatic particulars of the surfaces, or noise) can be removed.

The low-pass, particularly Gaussian, filtering is performed in a way similar to that described for the Sobel operation: a low-pass filtering mask is applied in succession to the pixel values in the completed foreground binary mask 387. The number and values of coefficients in the low-pass filtering mask depend on the needed strength of the filtering action, i.e. on the spatial correlation among the pixels: the higher the spatial correlation, the wider the filtering mask.

For example, assuming that a videocamera provides source video frames in the CIF format (352×288 pixel), a 9×9 low-pass Gaussian filtering mask is suitable.

A known mathematical property of the Gaussian filter is its separability: thanks to this property, instead of performing the convolution in a single step, which, for a 9×9 filtering mask, would mean processing, for each pixel, 81 pixel values (so that the GPU should perform, for each pixel of the completed foreground binary mask 387, 81 multiplications and additions, and 81 texture fetches), an identical result can be obtained by performing the convolution in two steps, involving a horizontal and a vertical pixel scan; for each pixel, a number of 9×1 and 1×9 pixel values are to be processed in each scan, for a total of 18 operations for each pixel. In an embodiment of the present invention, the coefficients of the low-pass filtering masks used in the horizontal and vertical scans are the following:

[0.01171875; 0.046875; 0.11328125; 0.1953125; 0.265625; 0.1953125; 0.11328125; 0.046875; 0.01171875]

It can be appreciated that the filtering mask coefficients are not integer: thus, after the convolution the result is no more a binary mask, rather a mask of real numbers ranging from 0 to 1, and the generic mask element may be interpreted as representing the probability that the corresponding pixel belongs to a foreground subject. In order to re-obtain a binary mask, the generic real number may be compared to a predetermined threshold, e.g. 0.5, so as to re-obtain a binary value (depending on the comparison result: lower or higher than 0.5) which, compared to the corresponding value in the completed foreground binary mask, provides a more reliable indication that a pixel belongs to the foreground or the background. It is pointed out that the comparison threshold may be put closer to one of the two extremes of the [0;1] interval of values, so as to bias the decision in a sense or in the opposite. For example, if an error made by considering a background pixel as belonging to the foreground is considered less dangerous, for the final result, with respect to the opposite, the comparison threshold may be decreased.

It is pointed out that the type of low-pass filtering, the size of the filtering mask, the values of the filtering mask coefficients disclosed above are per-se not limitative to the present invention. Other choices can be made by the skilled in the art. Also, while the operation of low-pass filtering can expediently be performed by the GPU, nothing prevents that, in alternative embodiments of the present invention, all or part of this operation is performed by the CPU.

The (filtered completed) foreground binary mask 388 is preferably fed to a morphological closing module 355, adapted to perform an operation of morphological closing of the foreground image defined by the binary mask.

As known in the art, the morphological closing is an operation adapted to correct at least some of the artifacts present in the foreground binary mask, particularly artifacts in the form of holes in the foreground subjects, caused for example by similarities between the color of the foreground subject and of the underlying background pixels.

In particular, three types of artificial "holes" may be present in the foreground binary mask:
very small holes (of the diameter of few pixels), caused by chromatic details of the foreground subject that do not significantly differ from the background (like the color of the hairs, or of patterns in the foreground subject clothes, or of accessories like wristwatches, glasses, and the like; for example, a tie with dots of the same color as the background may lead to several small, isolated undesired holes in the foreground binary masks);
large holes, when there are large areas of the foreground subject that do not significantly differ in color from the background (for example, a talking head wearing a red shirt with a red wall on the background);
actual holes (not to be suppressed), caused for example by the particular shape of the foreground subject, or by the particular position of the foreground subject (for example, when the talking head places his/her hands on his/her sides, the background area visible between the arm and the trunk is not to be considered part of the foreground subject).

The morphological closing operation is particularly adapted to eliminate the first type of artifacts.

In particular, the morphological closing operation is carried out in two steps. In a first step (also referred to as a "mask dilation"), the foreground subject areas in the filtered, completed foreground binary mask 388 are expanded, or "dilated"; then, in the second step (also referred to as a "mask erosion"), the foreground subject areas in the mask are brought back to their original dimensions. The elimination of the artifacts is achieved thanks to the fact that, after the mask dilation, small holes possibly present in the foreground subject areas are absorbed by the foreground, and, after the erosion operation, they disappear.

In greater detail, all the pixels in the filtered, completed foreground binary mask 388 are processed; for each pixel, a certain number of neighboring pixels are considered, for exampled all those pixels contained in a rectangle (the "dilation window" or "dilation mask") of predetermined size, like 3×3 pixels or 9×9 pixels (preferably, the size of the dilation mask depends on, in particular it is equal to the size of the low-pass filtering mask used in the low-pass filtering module 350). In the dilation step, the value ("1" or "0") characterizing the pixel under processing in the foreground binary mask is replaced by the maximum among the value of the considered pixel and the values of the neighboring pixels; thus, the value of a generic pixel initially equal to "0" (i.e., a background pixel), is changed from "0" to "1" if even a single one of the (e.g., 8 or 80) neighboring pixels is a "1" (it is observed that in case the opposite convention is adopted for indicating foreground pixels, the minimum is taken instead of the maximum).

As in the case of the Gaussian filtering, both the dilation and the erosion operations are separable into two elementary operations, performed along the horizontal and the vertical directions.

After the dilation, the obtained dilated foreground binary mask is rather compact and regular, in terms of distribution of the "1"s, even if it was initially irregular and with several holes in the foreground subject area. However, the dilation operation causes the contours of the foreground subject to be expanded, and isolated pixels or small pixel clusters, that remain in the background area after the low-pass filtering operation, are enlarged by the dilation operation.

In the subsequent mask erosion phase, the value of the generic pixel is replaced by the minimum (maximum, if the opposite convention is adopted for indicating foreground pixels) among is own value and the values of the neighboring pixels. After the erosion operation, the size of the foreground subject in the foreground binary mask return to the initial size, still preserving the properties of compactness and regularity achieved after the dilation phase. Isolated points (single pixels or small pixel clusters) in the background areas return to their original size; however, if such points are located within or close to the foreground subject, they tend to be absorbed into the foreground subject.

Let a generic pixel $s_0$ be considered; under the assumption that the dilation operation is performed in two phases, along the horizontal and the vertical directions, let the horizontal scanning be considered; for the pixel $s_0$, the neighboring pixels (using a 9×9 mask) are:

$$s_{-4}|s_{-3}|s_{-2}|s_{-1}|s_0|s_1|s_2|s_3|s_4$$

As discussed above, under the assumption that a foreground pixel is indicated by a "1" in the foreground binary mask, the dilation phase provides for replacing the value (in the filtered, completed foreground binary mask 388) of the pixel $s_0$ with the maximum among the values of the pixel $s_0$ and the eight neighboring pixels. In the subsequent erosion phase, the value of the pixel $s_0$ is replaced by the maximum among the values of the pixel $s_0$ and the eight neighboring pixels.

The Applicant has observed that the conventional way of performing the morphological closing operation does not always provide good results. In particular, foreground subject edges that were already well defined in the filtered, completed foreground binary mask 388 may be altered after the morphological closing operation, so as to cause artifacts in the foreground subject.

For example, relatively small spaces between the talking head's fingers, or the areas surrounding the hair and the neck, or the armpits, that for a correct segmentation have to be considered as belonging to the image background, could not preserved by the morphological closing. In particular, real holes in the foreground subject, if relatively small in size and close to the foreground subject contour, may disappear.

In order to solve this problem, the Applicant has devised a new, improved method for performing the dilation and erosion operations.

According to an embodiment of the present invention, the maximum is calculated starting from the pixel under processing (which is located in the middle of the dilation/erosion mask) and proceeding towards the periphery of the dilation/erosion mask; as soon as a pixel is encountered that belongs to an edge of the foreground subject, the proceeding towards the periphery is stopped, and the maximum is calculated using less pixels than those present in the dilation mask.

To this purpose, the morphological closing module 355 receives, in addition to the filtered, completed foreground binary mask 388, the map 385 resulting from the edge subtraction provided by the edge subtraction module 340. In order to assess whether a pixel belongs to an edge of the foreground subject, the morphological closing module 355 may be adapted to identify, in the map 385 of edge differences, positive edge differences that exceed a predetermined threshold (so as to have a tolerance against noise).

For example, let it be assumed that the pixels $s_{-2}$ and $s_3$ belong to a foreground subject edge: according to an embodiment of the present invention, in the dilation phase the value of the pixel $s_0$ is replaced by the value $\max(s_{-1}, s_0, s_1, s_2)$, without considering the remaining pixels included in the dilation/erosion mask, which are "beyond" the foreground subject edges compared to the pixel under processing. The pixels, like $s_{-2}$ and $s_3$ in the considered example, belonging to the edges may or may not be considered in the calculation of the maximum; the Applicant has observed that better results can be obtained by not including the edge pixels in the calculation of the maximum. In this case, assuming, e.g., that the pixels $s_{-1}$ and $s_1$ both belong to edges of the foreground subject, the value of the pixel $s_0$ is left unaltered. If none of the neighboring pixels included in the dilation mask belongs to an edge of the foreground subject, the dilation operation coincides with the replacement of the value of the pixel under processing with the maximum among the value of the considered pixel and those of all the neighboring pixels defined by the chosen dilation mask.

A similar operation is performed in both the dilation and the erosion phases, and in particular in both the horizontal and the vertical scans of the dilation and the erosion operations. It is worth noting that, in the erosion phase, the order opposite to that followed in the dilation phase should be respected (i.e., for example, horizontal scan first, followed by the vertical scan in the dilation phase and then vertical scan first, followed by the horizontal scan in the erosion phase), in order to avoid "bypassing" of the edges.

In other words, according to an embodiment of the present invention, the morphological closing operation is guided, that is, controlled, by the edges of the foreground subject.

The result of the edge-guided morphological closing is a closed foreground binary mask 389 wherein small holes and irregularities previously present in the filtered, completed foreground binary mask have been filled.

Compared to a morphological closing operation not guided by the foreground subject edges, i.e. performed by taking, for the generic pixel being processed, the maximum and the minimum of the values of all the neighboring pixels specified by the dilation/erosion mask, the edge-guided morphological closing operation according to an embodiment of the present invention avoids altering the foreground subject contours that were already well defined in the filtered, completed foreground binary mask 388, like for example, relatively small spaces between the taking head's fingers, or the areas surrounding the hairs and the neck, or the armholes, that for a correct segmentation have to be considered as belonging to the image background, are preserved. In other words, the edge-guided morphological closing operation allows eliminating or significantly reducing artifacts of the first type mentioned above, preserving the real holes close to the foreground subject's contour, even if relatively small in size.

In alternative embodiments of the invention, instead of using the map of edge differences 385, the edge-guided morphological closing module may exploit either one or both of the edge maps 381 and 383.

It can be appreciated that the dilation and erosion operations are adapted to performed by the pixel processors of the GPU, because both in the dilation and in the erosion phase, the values taken as inputs are the original ones, not those modified by the dilation and respectively erosion operations being executed. Thus, the dilation and erosion operations can be implemented as a (part of a) pixel shader program, executed by the (pixel processors of the) GPU. In particular, if, as for the Gaussian filtering, the dilation and the erosion operations can be separated into two elementary operations, performed along the horizontal and the vertical directions, so that the number of texture fetches required for the generic pixel can be reduced, for example from 2×81=162 to 2×2× 9=36 (in the exemplary case of a 9×9 dilation/erosion mask) with a reduction of the order of 78% of the calculation complexity.

It is pointed out that, however, nothing prevents that, in alternative embodiments of the present invention, the dilation and erosion operations (either edge-guided or not) are performed by the CPU.

After the (optional) edge-guided morphological closing operation, the foreground binary mask 389 is fed to an image contour extraction module 360. The map of edge differences 385 produced by the edge subtraction module 340 may also be provided to the image contour extraction module 360. The image contour extraction module 360 is adapted to assess whether the generic pixel of the current video frame belongs to a contour of the foreground subject.

Conventionally, in digital image processing, a subject contour is considered as formed by pixels.

Figure 8A:
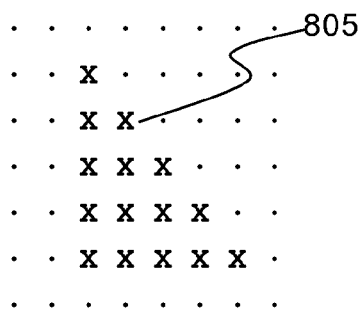
FIGS. 8A to 8D schematically show a new method of describing contours of subjects, according to an embodiment of the present invention.

In particular, and merely by way of example, FIG. 8A shows a portion of a video frame wherein a foreground subject having the shape of a triangle is present; the pixels of the foreground triangle are marked as "X", whereas the background pixels are marked as dots "•". In the example considered, the pixels marked as "C" in FIG. 8B are conventionally considered to form the contour of the triangle.

The Applicant has observed that with this technique may become very difficult to identify the contours of the image subjects by following the pixels identified as contour pixels: an extremely high number of ambiguous situations that are not easily solved can be encountered. For example, let the pixel labeled 805 in FIG. 8A or 8B be considered, belonging to the contour of the triangle. The considered pixel 805 has adjacent thereto other four pixels identified as contour pixels. Let it assumed that it is desired to follow the contour of the triangle clockwise: once arrived at the pixel 805, it is not possible (unless based on a high-level observation of the whole triangle) to determine which will be the next pixel in the contour scanning: as far as only a local analysis of the surroundings of each pixel is performed, either the pixel 807*a*, or the pixel 807*b*, or the pixel 807*c* could be the next contour pixel; the ambiguity can be resolved if, instead of a local pixel analysis, the whole subject shape is considered: this would allow determining that the next contour pixel is the pixel 807*a*. In other words, in order to follow the contour of an image subject, a local analysis of the surroundings of the generic pixel is normally not sufficient, and it is instead necessary to have an overall knowledge of the subject which, in practical cases, is very computation-intensive and sometimes even impractical.

According to an embodiment of the present invention, in order to overcome the problems evidenced above, the concept of border between two generic adjacent pixels has been introduced by the Applicant, so that an image contour is not considered formed by pixels, but is rather formed by borders between adjacent pixels.

Figure 8B:
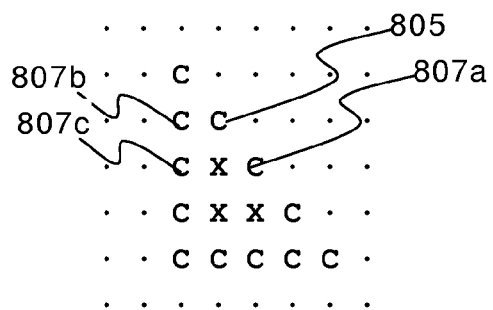
Figure 8C:
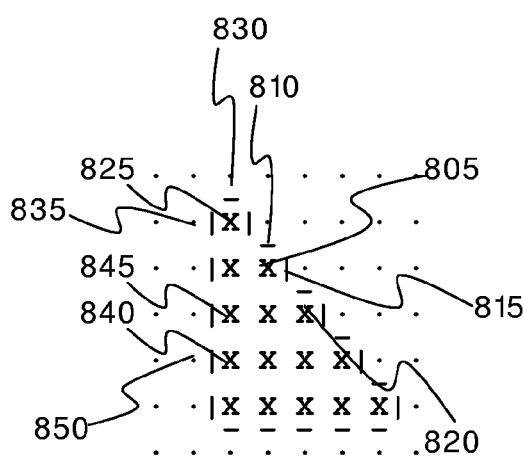

For example, referring to FIG. 8C, the triangle contour, instead of being considered formed by the pixels marked as "C" like in FIG. 8B, is considered formed by the (20) horizontal and vertical line segments around the pixels marked as "X". Considering again the pixel 805, it can be appreciated that with this description, even by means of a local analysis, there are no ambiguities about how to follow the triangle contour; for example, if it is desired to follow the triangle contour clockwise, the pixel borders can be followed applying the conventional criterion that the background (i.e., pixels marked as "•") has to be kept on the left: the upper horizontal border 810 is followed from left to right, and then the right vertical border 815 is followed from top to bottom, thus arriving at the upper horizontal border of the next pixel 820, and so on, until the starting pixel border is reached.

Figure 8D:
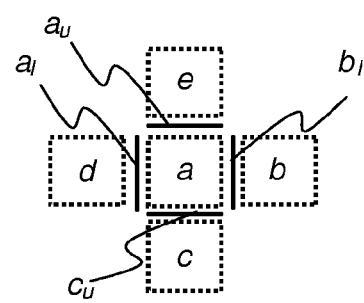

Each pixel has four borders around it. In an embodiment of the present invention, each pixel is assigned the ownership of two of the four borders between the considered pixel and the pixels adjacent thereto, for example the upper border and the left-hand border. As schematically depicted in FIG. 8D, pixel α owns the borders $α_l$ and $α_u$ (shared with adjacent pixels d and e) whereas the border between pixel α and pixel c is the upper border $c_u$ owned by pixel c, and the right-hand border between pixel α and pixel b is the left-hand border $b_l$ owned by pixel b.

A GPU texture can be used to store, for each pixel, the following data:
  whether either one or both of the (left-hand and upper, in the present example) borders owned by that pixel is or not part of a contour of a foreground subject. This can be determined by a local analysis of the pixel surroundings, i.e. by examining the adjacent pixels located on the left and above with respect to the considered pixel: if the considered pixel and the adjacent pixel are of the same type (both background or both foreground pixels), the associated pixel border is not part of a contour of a foreground subject; if instead the upper adjacent pixel and/or the left-hand adjacent pixel are of different type compared to the considered pixel (i.e. one belonging to the background, the other to the foreground), the associated pixel border is part of a foreground subject contour. For example, considering the pixel labeled 825 in FIG. 8C, both of the borders that pixel 825 owns are part of the triangle contour, because pixels 830 and 835 belong to the background, whereas pixel 825 belongs to the foreground; considering instead pixel 840, only the left-hand border is part of the triangle contour, because the left-hand adjacent pixel 850 is part of the background, whereas the upper adjacent pixel 845 is part of the foreground like pixel 840;

in case one or both of the borders owned by the considered pixel are part of a foreground subject contour, the direction to be followed when traveling on the pixel border; for example, assuming by convention that an image contour has to be followed clockwise, if the pixel belongs to the foreground the left-hand border is to be traveled upwards, whereas the upper border is to be traveled from the left to the right, and vice versa for a pixel belonging to the background.

Figures 9A, 9B, 9C:
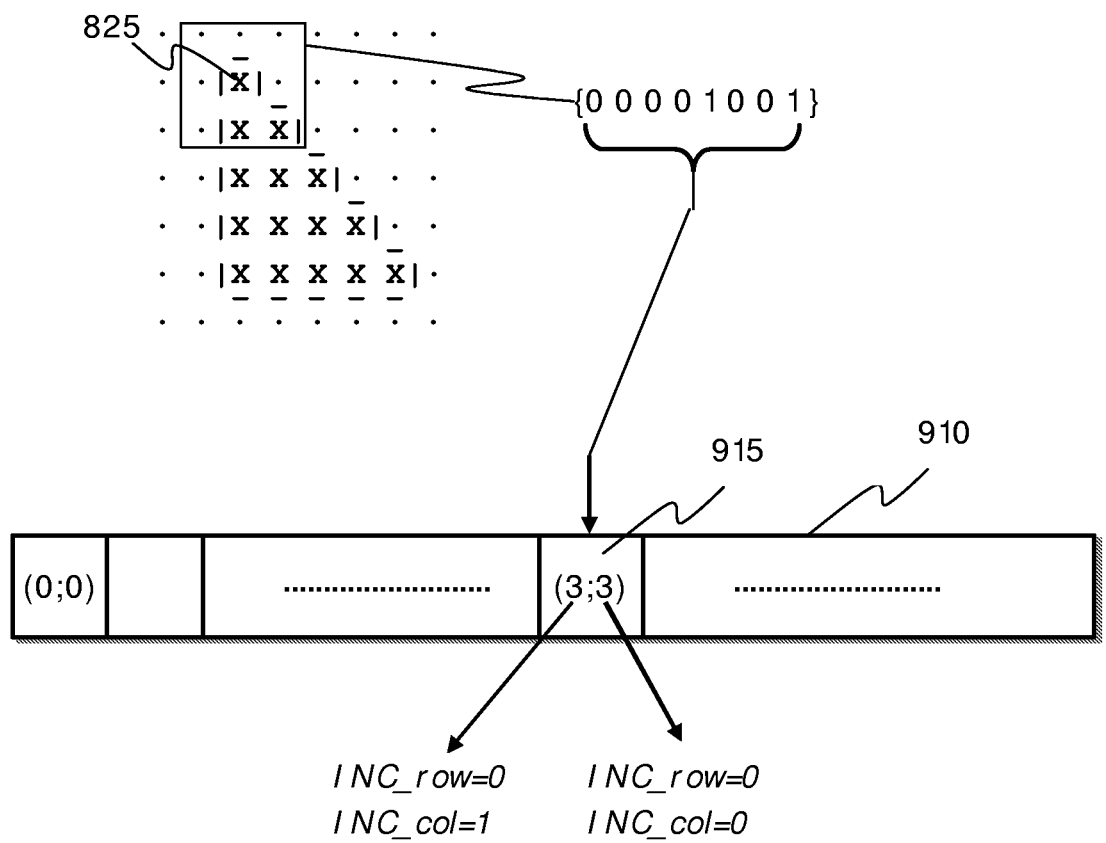
FIGS. 9A, 9B and 9C schematically show a method for associating to a pixel belonging to a subject contour an information about further continuation of the contour beyond the pixel itself.

As an alternative to storing the direction (or, possibly, in addition thereto), if a border of a pixel belongs to a foreground subject contour, it is possible to determine, and store in the texture, in association with that pixel, information adapted to describe where (i.e., at which pixel border) the contour continues. For example, let the situation of FIG. 9A be considered, wherein A, B, C, D, F, G, H and I are the pixels adjacent to a generic pixel E; let it be assumed that the upper border of the pixel E belongs to a contour of a foreground subject (as represented by a "-" over the pixel E in FIG. 9A). From there, the contour might continue to either one of the positions denoted 1, 2, 3, 4, 5 or 6 in FIG. 9A. Similarly, referring to FIG. 9B, let it be assumed that the left-hand border of the pixel E belongs to a contour (as represented by a "-" on the left of the pixel E in FIG. 9B): from there, the contour may continue to either one of the positions denoted 1, 2, 3, 4, 5 or 6 in FIG. 9B. It can be appreciated that the belonging of the pixel labeled I in the drawings to either the foreground or the background (i.e., the value, "1" or "0", of that pixel in the foreground binary mask 389) is not influent in the determination of where the contour continues after the pixel E. Thus, for each generic pixel, only eight pixels need to be considered for determining where a possible contour continues; since each of the eight pixels may take a value equal to "1" or "0", a total of 256 possible combinations exist. Thus, according to an embodiment of the present invention, a pixel shader program may be designed so that, using a look-up 1D texture with 256 positions, schematically represented in FIG. 9C and denoted as 910, the pixel shader program generates, for each pixel, two values, each one ranging from 0 to 6, adapted to establishing whether, for each of the two borders owned by that pixel, the border belongs to a foreground subject contour, and, in the affirmative case, where the contour continues. In particular, the value 0 may be reserved for identifying a border than does not belong to a contour. For example, considering again the pixel 825 in FIG. 9C, the respective value corresponding to the particular arrangement of background and foreground pixels is {0000101} (it has to be reminded that the lower right-end foreground pixel of the square in FIG. 9C is not considered), which univocally corresponds to a location 915 in the 1D texture 910, wherein the pair of values (3;3) is stored: the first value is associated with the left-hand pixel border, whereas the second value is associated to the upper border (see FIGS. 9A and 9B). In other words, the value corresponding to the binary-coded number representing the arrangement of foreground/background pixels in the positions A, B, C, D, E, F, G, H of a generic image area around the generic current pixel in position E is used as an accession key for accessing the 1D look-up texture 910. The pair of values defining, for the generic pixel, whether the left-hand and upper borders are part of a foreground subject contour, and, in the affirmative case, where the contour continues is stored in an output texture 393.

For pixels located at the edges of the video frame, the pixels missing in the pattern of neighboring pixels are, by default, considered as background pixels. The output texture 393 may be generated so as to correspond to an enlarged video frame, including an additional pixel column at the right-hand video frame edge and an additional pixel row at the bottom video frame edge (both the additional row and the additional column including background pixels), in order to enable considering of the right-hand border of the pixels belonging to the last right-hand video frame column, as well as the bottom border of the pixels belonging to the bottom video frame row.

Coming back to FIG. 3, in a preferred invention embodiment, the contour extraction module 360 is further adapted to exploit the information included in the edge difference map 385 to verify whether the current pixel (or pixel neighboring thereto) belongs to an edge of the foreground; for example, information may be derived related to whether, moving far from the considered pixel (for relatively few pixels) towards the inner part of the foreground subject (i.e., moving far from the background) high values in the edge difference map 385 (high absolute difference values, or high positive difference values) are encountered. Such indication is preferably stored, in the output texture 393, in respect of each pixel, to be used in a scene analysis phase performed by the scene analysis module 365.

The output texture 393 of the contour extraction module 360 is then transferred from the GPU to the CPU, for the final operations, which are to be implemented in sequential form and thus are not adapted to be executed by the pixel processors of the GPU. It is pointed out that albeit having the GPU perform the contour extraction operation is advantageous, nothing prevents that, in alternative embodiments of the invention this operation is performed by the CPU.

In particular, a scene analysis module 365 is adapted to use the results of the contour extraction module 360 to follow the contours of the foreground subjects, so as to determine and store ordered lists of pixels that belong to the foreground subject contours. The scene analysis module 365 may also establish hierarchical relationships between the determined contours, i.e. between different areas of the current video frame.

In particular, once the pixels of a contour of a foreground subject have been identified and put in an ordered list, the area of the image enclosed within the contour is completely determined. On this area, it is possible to perform high-level processing such as for example calculating the surface area, or the "bounding box" thereof, i.e. a circumscribed square or rectangle, so as to assess whether the image zone is sufficiently wide to be taken into consideration or rather it can be neglected. Alternatively or in combination, holes in the determined foreground subjects areas that contain further foreground subject areas thereinside could be filled. Alternatively or in combination, isolated foreground areas that do not touch the video frame edges could be discarded (a talking head usually does not have separated parts, and at least touches the bottom edge of the video frame).

According to an embodiment of the present invention, the closed foreground binary mask 389 resulting from the operation of edge-guided morphological closing and the ordered list(s) of pixels forming the contour(s) of the foreground subject(s) are fed to an encoder module 370, e.g. complying with the MPEG standard, together with the current video frame 305. According to an embodiment of the present invention, the encoder module 370 implements a foreground mask correction adapted to correct the closed foreground binary mask 389 taking into account the foreground subject contours conveyed by the ordered list(s) of pixels forming the contour(s) of the foreground subject(s) provided by the scene analysis module 365. The encoder module 370 generates an MPEG transport stream 397 that corresponds to the segmented foreground for the current video frame 305, and which is fed to a transmitter module 375 for transmission to a remote receiver, via the NIA/MODEM 250.

Figure 4:
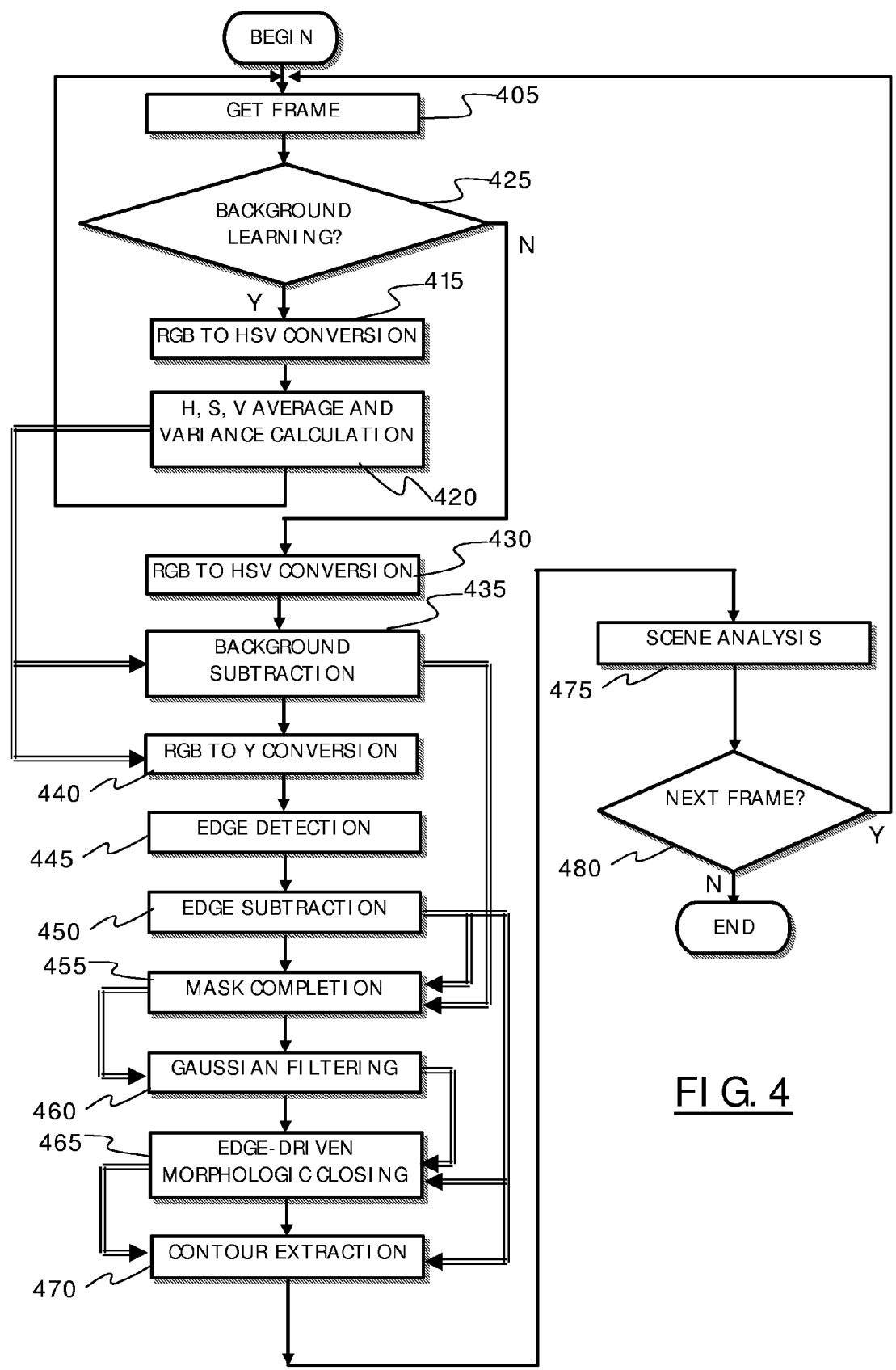
FIG. 4 is a simplified flowchart illustrating the main steps of a method according to an embodiment of the present invention.

A video segmentation method according to an embodiment of the present invention will be now described, with the aid of the simplified flowchart of FIG. 4.

The video frames making up the video stream captured by the videocamera are fed to the GPU (block 405).

Preliminarily, at the beginning of a video sequence, a background learning phase is obtained, wherein a statistical model of the background is built, as described in detail in the foregoing. The talking head is requested to leave the scene for a while, and a sufficiently high number (e.g. 100) of video frames are captured; each video frame, for example originally in RGB format, is converted into HSV format (block 415), and then the average value and the variance for each of the three coordinates H, S and V are calculated (block 420); in particular, as discussed in the foregoing, for the calculation of the average value and variance of the H (angular) coordinate, the averaging method described in the foregoing is adopted. These operations are repeated, i.e. the background learning phase lasts until the prescribed number of samples of background have been acquired (decision block 425).

FIG. 10A is a screen capture showing an example of a background statistical model obtained after the background learning phase (the screen captures presented are in black and white merely for compliance to patent documentation rules, albeit originally they were in color).

The talking head can now enter the scene.

The video frames making up the video stream captured by the videocamera are repeatedly fed to the GPU (block 405), and converted from the RGB space into the HSV space (block 430). FIG. 10B is a screen capture of an exemplary current video frame.

Figure 10C:
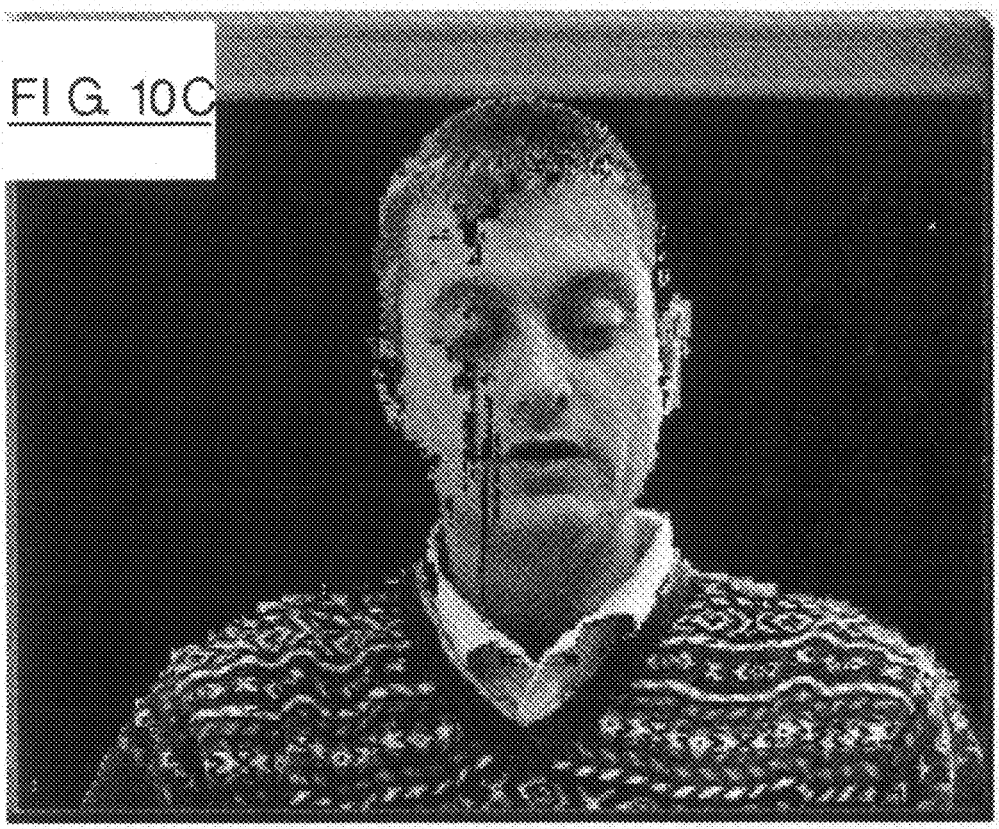

The approximated foreground binary mask 380 is built by means of the described background subtraction process described in the foregoing, which involves comparing, for each pixel, the values of the coordinates H, S, V in the current video frame to the average values calculated in the background learning phase, and assigning to the generic pixel the value "1" or "0" based on the said comparison (block 435). In particular, as described in the foregoing, the absolute values of the differences of the coordinates H, S and V in the current video frame to the corresponding average values are calculated, and compared to the standard deviation of the respective coordinate (or to a value proportional thereto), and the results of the tests on the three coordinates are combined e.g. OR-ed or AND-ed together, so as to determine whether the value to be assigned to a pixel is a "1" (pixel presumably belonging to the foreground) or a "0" (pixel presumably belonging to the background). FIG. 10C is a screen capture of a segmentation that would result by using the approximated foreground binary mask 380: several "holes" in the area of the talking head are visible.

Then, the approximate foreground binary mask is completed.

To this purpose, for each pixel of the current video frame, and for each pixel of the background statistical model, the luminance value is then calculated (block 440).

Figure 10D:
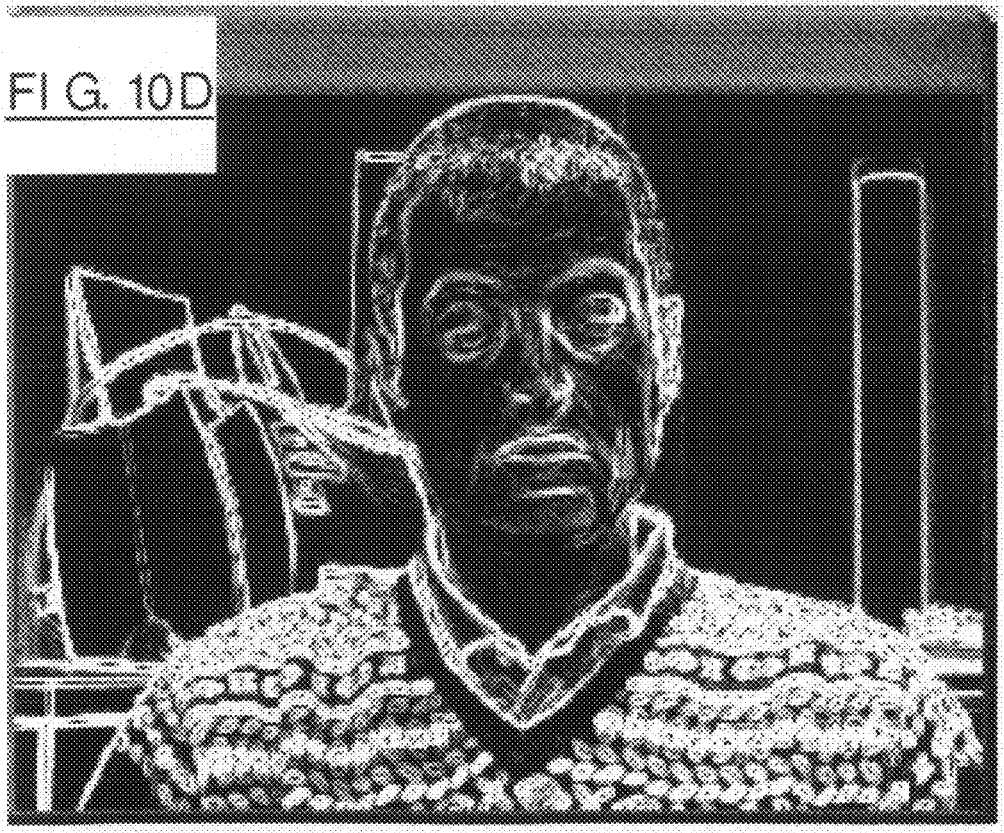

Edges in the current video frame and in the statistical model of the background are then detected (block 445), applying a high-pass filtering, e.g. a Sobel operator, to the pixel luminance, as described in the foregoing. FIG. 10D is a screen capture showing the map of the edges for the current video frame.

The edges in the background statistical model are then subtracted from the edges in the current video frame (450), and the map 385 of edge differences is built, as described in the foregoing; the previously built approximated foreground binary mask is completed (block 455) exploiting the information included in the map of edge differences, to obtain the completed foreground binary mask 387. FIG. 10E is a screen capture of the completed foreground binary mask: it can be appreciated that the foreground subject contours are better defined, and this will cause less artifacts in the reconstructed, displayed video sequence.

Figure 10G:
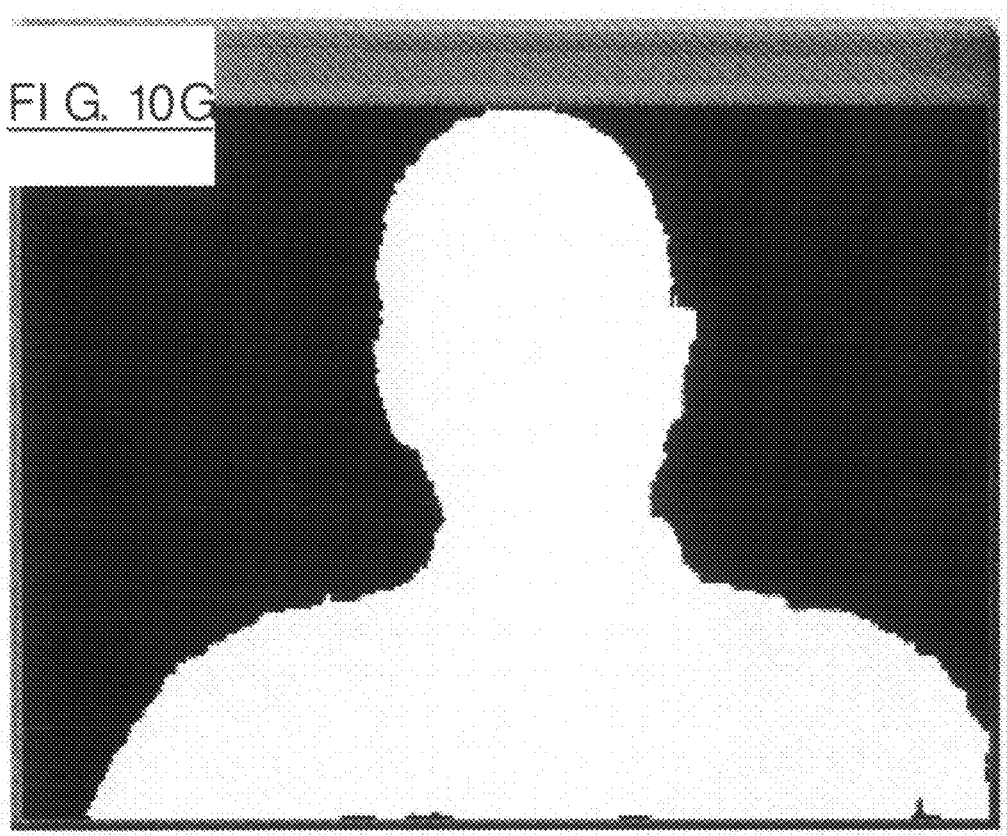

The completed foreground binary mask 387 is then submitted to a low-pass (e.g., Gaussian) filtering (block 460), to obtain the filtered completed foreground binary mask 388 (FIG. 10F is a screen capture of the mask of FIG. 10E after filtering), and then the edge-guided morphological closing of the mask is performed (block 465), exploiting the information included in the map of edge differences for determining which pixels belong to an edge of the foreground subject. FIG. 10G shows the mask of FIG. 10F after the edge-guided morphological closing.

There follows the contour extraction operation (block 470), adapted to determine and store, for each pixel, information regarding the fact that either one or both of the two borders owned by the pixel belong to a contour, and, in the affirmative, where the contour continues. This operation completes the sequence of operations performed by the pixel processors of the GPU.

The data are then passed to the CPU, which performs the analysis of the scene, based on the information received from the GPU, in order to determine and store ordered lists of pixels belonging to the contours of the foreground subjects.

The procedure is repeated on the next and following frames of the video sequence (decision block 480).

In an embodiment of the present invention, the procedure for the recognition of the different image zones and the storage of the respective contours in the scene analysis module 365 (see FIG. 3) encompasses one scan only of the current video frame, in raster order, and is therefore relatively fast and cache-friendly. A possible embodiment of the algorithm is described hereinbelow.

Considering the generic current video frame, the output texture 393 is raster scanned line by line, starting for example from the uppermost line, leftmost pixel.

For each line of the current video frame, and for each pixel of the considered line, it is ascertained whether the left border of the pixel under consideration belongs to a not previously encountered contour.

If encountered, the contour is followed until it forms a closed loop, i.e. until it returns to the first encountered pixel of the contour, and all the pixels belonging thereto are properly marked.

In particular, for each pixel, two contour identifiers are defined, IDleft and IDup, respectively for the contour to which the left-hand border of the pixel belongs, and for the contour to which the upper border of the pixel belongs.

At the beginning of the video frame raster scan, the two contour identifiers IDleft and IDup are set to 0 for all the pixels; a 0 indicates that the contour has not yet been explored (or that the pixel borders do not belong to any contour).

Also, a variable last-contour is exploited, whose value is used to define a contour identifier; such a variable is initially set to 0, and it is increased by one each time a new contour is encountered.

A further border-type variable is exploited, whose values are used to define whether the pixel border belonging to the contour is a left-hand border or an upper border.

Another variable contour-length may also be exploited, whose value defines the length (i.e., the number of pixel borders) of the contour.

During the raster scan, for the generic pixel under consideration it is ascertained whether the left-hand border thereof belongs to a foreground subject contour, which means having, in the output texture 393, a value different from 0 as the first of the pair of values associated to that pixel.

When such a pixel is encountered, it is ascertained whether, for that pixel, it is IDleft=0: in the affirmative case, a new contour has been encountered: the value of the variable last-contour is increased by one, the value of the border-type variable is set to left, and the value of the variable contour-length is set to 0. The following operations are then repeated until the whole contour has been followed:

for the pixel considered, the one between the identifiers IDleft and IDup that corresponds to the value of the variable border-type is set equal to the value of the variable last-contour;

using the information contained in the output texture 393 it is ascertained whether the contour continues with a left-hand pixel border or with an upper pixel border; for example, referring to FIG. 9C, when the pixel 825 is encountered, from the value (3;3) stored in respect thereof it is possible to ascertain that the contour to which the pixel left-hand border belongs continues with the upper border of the same pixel;

the values stored in the output texture 393 in respect of that pixel are used to determine the image line and/or column increments to be applied to move to the next pixel where the contour continues;

the variable contour-length is incremented by one.

For example, considering again the pixel 825 of FIG. 9C, after encountering the contour at the left-hand border thereof, the next iteration concerns again the pixel 825 (the line and column increments are 0 in such a case), and particularly the upper border thereof; the identifiers IDup for the pixel 825 is set equal to the value of the variable last-contour, so as to declare that the upper border of the pixel 825 belongs to the same contour as the left-hand border thereof, the position of the next pixel is determined (namely, the pixel 805, in FIG. 8A), the variable contour-length is incremented by 1, and so on.

These operations are repeated until the pixel coordinates (line and column) coincide with the saved coordinates of the first pixel encountered for that contour.

When instead, during the raster scan, a pixel is encountered whose left-hand border thereof belongs to a foreground subject contour, but the value of the identifier IDleft is different from 0, a value of a variable inside, associated with the contour identified by the value of the identifier IDleft of the pixel and initially set to false when the contour is identified the first time, is set to negation of its previous value, so as to denote that the pixel under processing is inside the contour identified by the value of the identifier IDleft of the pixel under processing.

Figure 10H:
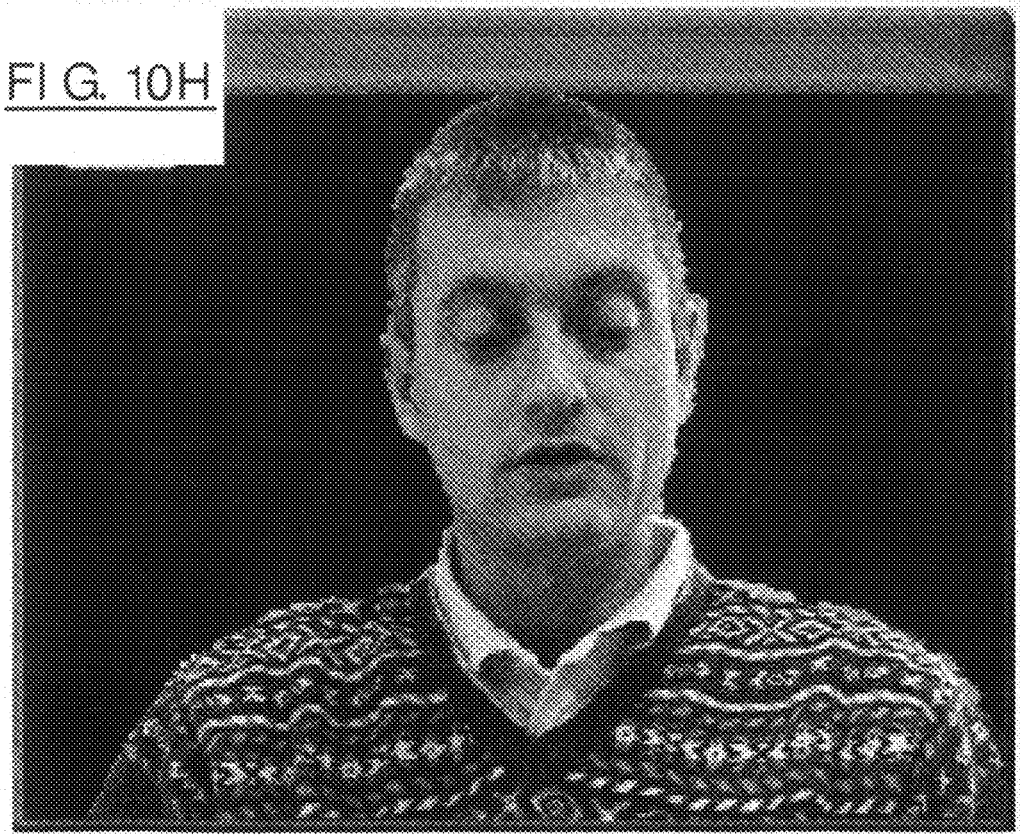

FIG. 10H shows the result of the segmentation process: the original background has been replaced with a different one, in this case a monochrome background. The result is relatively neat and without evident artefacts.

The present invention can be implemented rather easily, for example by means of suitable software. However, implementation in software is not to be intended as a limitation to the present invention, which can be as well implemented totally in hardware, or as a mix of software and hardware.

Although the present invention has been disclosed and described by way of some embodiments, it is apparent to those skilled in the art that several modifications to the described embodiments, as well as other embodiments of the present invention are possible without departing from the scope thereof as defined in the appended claims.

For example, instead of or in addition to generating a binary mask, i.e. a mask wherein each pixel of the video frame is characterized by either a "1", when that pixel belongs to the foreground, or a "0", when the pixel belongs to the background, an "alpha" mask could be generated, wherein each pixel is characterized by a value ranging continuously, or taking one of a discrete set of values within two extremes, for example 0 and 1; a value equal to one of the two extremes means, as in the case of the binary mask, that the pixel belongs to either the background or the foreground; an intermediate value between the two extremes identifies a pixel that is recognized to belong to a border between the foreground and the background (e.g., the hair, which makes the contour of the talking head not sharp), wherein it is preferable that the transition be smooth rather than abrupt.

Also, as already pointed out in the foregoing, even though in a possible invention embodiment the GPU is expediently used for performing most of the operations involved in the segmentation algorithm, nothing prevents that, in alternative embodiments, one or more of the operations that have been described as performed by the GPU are instead performed by the CPU.

Furthermore, instead of using HSV conversion, different color spaces could be used (such as HIS, YUV, etc,).

Moreover, although in the foregoing reference has always been made to a video frame sequence captured in real time from a videocamera, this is not to be considered as limiting the invention. In fact, the video sequence to be segmented could be an already existing video sequence, for example stored in the memory of the data processing apparatus.

The invention claimed is:

1. A method of image processing, comprising:

receiving at least one video frame of a video sequence, the at least one video frame comprising at least one foreground subject and a background; and processing the at least one video frame so as to separate the at least one foreground subject from the background, wherein the processing comprises:

obtaining a reference image comprising the background, the reference image being captured without the at least one foreground subject;

comparing the at least one video frame to the reference image;

generating a first pixel mask as a result of the comparison, the pixel mask indicating whether a pixel of the at least one video frame belongs to the foreground subject or to the background;

determining edges in the at least one video frame to generate a first edge mask;

determining edges in the reference image to generate a second edge mask;

comparing the first edge mask with the second edge mask to generate an edge-difference mask indicating differences between the first edge mask and the second edge mask;

generating a second pixel mask by adding the edge-difference mask to the first pixel mask;

modifying the second pixel mask based on the edge-difference mask; and forming a contour of the foreground object based on the modified second pixel mask and the edge-difference mask.

2. The method of claim 1, wherein the comparing the first edge mask with the second edge mask comprises identifying pixels of the video frame that belong to a determined edge in the at least one video frame and not to a determined edge in the reference image.

3. The method of claim 1, wherein the comparing the first edge mask with the second edge mask comprises identifying pixels of the video frame that belong to a determined edge in the reference image and not to a determined edge in the at least one video frame.

4. The method of claim 2, wherein the modifying the first pixel mask based on the edge-difference mask comprises adding to the first pixel mask the identified pixels.

5. The method of claim 1, wherein the determining edges in the at least one video frame or, respectively, in the reference image, comprises:

high-pass filtering the at least one video frame or, respectively, the reference image.

6. The method of claim 5, wherein the high-pass filtering the at least one video frame or, respectively, the reference image, comprises:

calculating a luminance value with respect to the pixels of the at least one video frame or, respectively, of the reference image; and applying at least one gradient operator to the calculated luminance values of the pixels in the at least one video frame or, respectively, in the reference image, so as to obtain a luminance gradient value for the pixels.

7. The method of claim 6, wherein the applying at least one gradient operator to the calculated luminance values of the pixels comprises:

applying a first gradient operator for obtaining a value of a first component of the luminance gradient along a first predetermined direction;

applying a second gradient operator for obtaining a value of a second component of the luminance gradient along a second predetermined direction; and obtaining the luminance gradient value by combining the values of the first and second components of the luminance gradient.

8. The method of claim 6, further comprising:

obtaining a luminance gradient difference value by subtracting the luminance gradient values of corresponding pixels in the reference image from the luminance gradient value of the pixels in the at least one video frame.

9. The method of claim 8, wherein the modifying the first pixel mask based on the edge-difference mask comprises:

assigning a pixel to the foreground subject in the first pixel mask in case the luminance gradient difference absolute value exceeds a predetermined threshold.

10. The method of claim 6, wherein the at least one gradient operator comprises a Sobel operator.

11. The method of claim 1, wherein the obtaining a reference image comprises obtaining a background statistical model based on a plurality of video frames not including foreground subject.

12. The method of claim 11, wherein the obtaining the background statistical model comprises:

providing a hue, saturation, value color space description of the video frames not including foreground objects; and calculating an average of the hue, saturation, value coordinates for each pixel of the captured video frames of the plurality.

13. The method of claim 1, further comprising wherein the modifying the second pixel mask comprises low-pass filtering the second pixel mask.

14. The method of claim 13, wherein the low-pass filtering the second pixel mask comprises applying a Gaussian filter to the second pixel mask.

15. The method of claim 13, further comprising applying morphological closing to the second pixel mask.

16. The method of claim 15, wherein the morphological closing is applied after the low-pass filtering.

17. A data processing apparatus comprising at least one microprocessor for executing a module to perform an image processing method according to claim 1.

18. The data processing apparatus of claim 17, wherein the data processing apparatus comprises a videotelephone.

19. The data processing apparatus of claim 17, wherein the data processing apparatus comprises a video-conferencing apparatus.

* * * * *